(12) United States Patent
Liu et al.

(10) Patent No.: US 9,342,610 B2
(45) Date of Patent: May 17, 2016

(54) PORTALS: REGISTERED OBJECTS AS VIRTUALIZED, PERSONALIZED DISPLAYS

(75) Inventors: James Chia-Ming Liu, Bellevue, WA (US); Anton Oguzhan Alford Andrews, Seattle, WA (US); Craig R. Maitlen, Woodinville, WA (US); Christopher M. Novak, Redmond, WA (US); Darren A. Bennett, Seattle, WA (US); Sheridan Martin Small, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 742 days.

(21) Appl. No.: 13/218,298

(22) Filed: Aug. 25, 2011

(65) Prior Publication Data
US 2013/0050258 A1 Feb. 28, 2013

(51) Int. Cl.
*G06F 17/30* (2006.01)
*G06F 3/01* (2006.01)
(Continued)

(52) U.S. Cl.
CPC .......... *G06F 17/3087* (2013.01); *G02B 27/017* (2013.01); *G06F 3/012* (2013.01); *G06F 3/013* (2013.01); *G06F 3/038* (2013.01); *G06T 19/006* (2013.01); *G02B 2027/014* (2013.01); *G02B 2027/0127* (2013.01); *G02B 2027/0138* (2013.01); *G02B 2027/0178* (2013.01);
(Continued)

(58) Field of Classification Search
CPC ........ G01C 21/00; G01C 21/34; G01C 21/26; G06T 19/006

USPC ........... 345/633; 701/533, 400, 25, 300, 420, 701/423, 428, 538, 26, 418, 436, 467, 487, 701/516
See application file for complete search history.

(56) References Cited

U.S. PATENT DOCUMENTS 5,640,464 A * 6/1997 Ebel et al. ...................... 382/143
6,266,612 B1 * 7/2001 Dussell et al. ................. 701/516
(Continued)

FOREIGN PATENT DOCUMENTS

EP 1271293 A2 1/2003

OTHER PUBLICATIONS

Henry, Peter, et al. "RGB-D mapping: Using depth cameras for dense 3D modeling of indoor environments." In the 12th International Symposium on Experimental Robotics ISER. Dec. 18-21, 2010.*
(Continued)

*Primary Examiner* — Carlos Perromat
(74) *Attorney, Agent, or Firm* — Dan Choi; Judy Yee; Micky Minhas

(57) ABSTRACT

A see-through head-mounted display (HMD) device provides an augmented reality image which is associated with a real-world object, such as a picture frame, wall or billboard. Initially, the object is identified by a user, e.g., based on the user gazing at the object for a period of time, making a gesture such as pointing at the object and/or providing a verbal command. The location and visual characteristics of the object are determined by a front-facing camera of the HMD device, and stored in a record. The user selects from among candidate data streams, such as a web page, game feed, video or stocker ticker. Subsequently, when the user is in the location of the object and looks at the object, the HMD device matches the visual characteristics to the record to identify the data stream, and displays corresponding augmented reality images registered to the object.

20 Claims, 20 Drawing Sheets

(51) Int. Cl.
*G06F 3/038* (2013.01)
*G02B 27/01* (2006.01)
*G06T 19/00* (2011.01)
*H04N 13/04* (2006.01)

(52) U.S. Cl.
CPC . *G02B2027/0187* (2013.01); *G06F 2203/0381* (2013.01); *H04N 13/044* (2013.01); *H04N 13/0468* (2013.01); *H04N 13/0484* (2013.01)

(56) References Cited

U.S. PATENT DOCUMENTS

| | | | |
|---|---|---|---|
| 6,985,240 B2 * | 1/2006 | Benke et al. | 356/614 |
| 7,511,703 B2 | 3/2009 | Wilson et al. | |
| 7,522,344 B1 * | 4/2009 | Curatu et al. | 359/634 |
| 7,532,197 B2 | 5/2009 | Clement et al. | |
| 7,564,469 B2 | 7/2009 | Cohen | |
| 7,698,407 B2 | 4/2010 | Mattox, Jr. et al. | |
| 8,036,678 B2 * | 10/2011 | Goldenberg et al. | 455/456.1 |
| 2002/0044152 A1 * | 4/2002 | Abbott, III | G06T 19/006 345/629 |
| 2002/0171670 A1 | 11/2002 | Clernock et al. | |
| 2004/0119662 A1 | 6/2004 | Dempski | |
| 2006/0262140 A1 * | 11/2006 | Kujawa et al. | 345/633 |
| 2007/0162413 A1 | 7/2007 | Sonetaka | |
| 2007/0188495 A1 | 8/2007 | Kiani | |
| 2007/0273610 A1 * | 11/2007 | Baillot | 345/8 |
| 2008/0030429 A1 | 2/2008 | Hailpern et al. | |
| 2008/0307066 A1 * | 12/2008 | Amidon et al. | 709/217 |
| 2009/0237328 A1 * | 9/2009 | Gyorfi et al. | 345/9 |
| 2009/0289956 A1 * | 11/2009 | Douris et al. | 345/633 |
| 2010/0302247 A1 * | 12/2010 | Perez et al. | 345/440 |
| 2010/0315418 A1 | 12/2010 | Woo | |
| 2011/0103651 A1 * | 5/2011 | Nowak et al. | 382/106 |
| 2011/0313653 A1 * | 12/2011 | Lindner | 701/201 |
| 2012/0105310 A1 * | 5/2012 | Sverdrup | G02B 27/017 345/8 |
| 2012/0105440 A1 * | 5/2012 | Lieberman et al. | 345/419 |
| 2012/0162255 A1 * | 6/2012 | Ganapathy et al. | 345/633 |
| 2012/0249741 A1 * | 10/2012 | Maciocci et al. | 348/46 |

OTHER PUBLICATIONS

Kirk, David, et al., "Putting the Physical into the Digital Issues in Designing Hybrid Interactive Surfaces," HCI 2009—People and Computers XXIII—Celebrating people and technology, Sep. 2009, pp. 35-44.

International Search Report & The Written Opinion of the International Searching Authority dated Jan. 30, 2013, International Application No. PCT/US2012/052382.

* cited by examiner

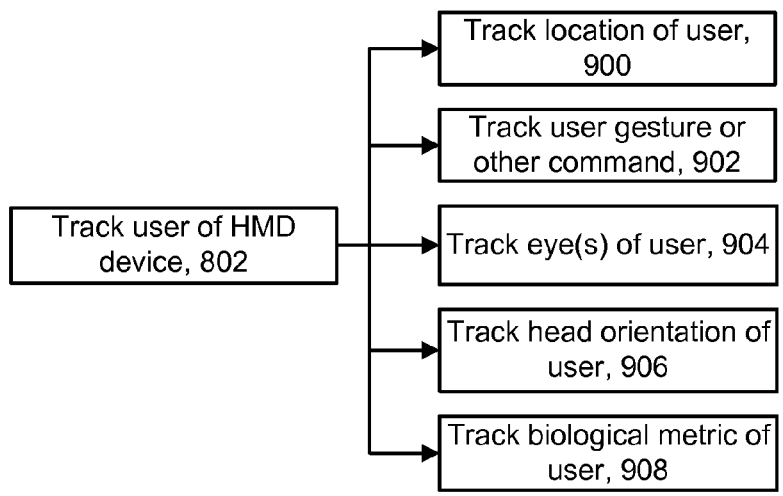
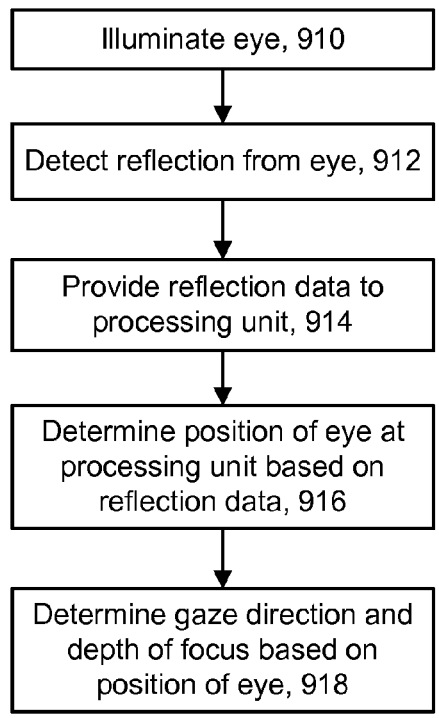
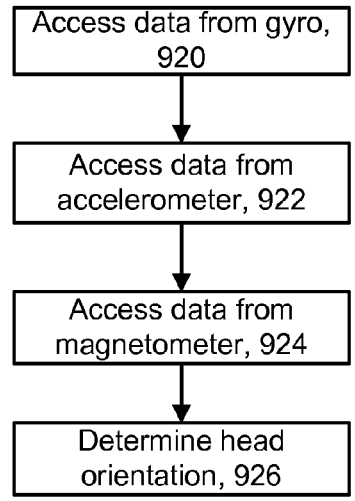

Fig. 10
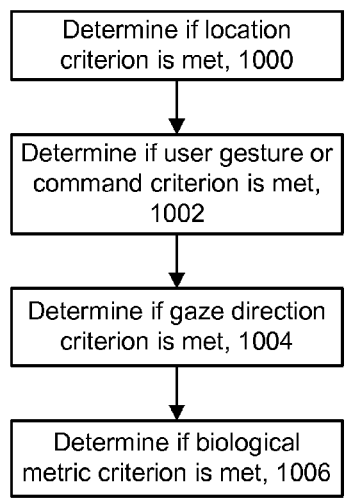
Fig. 11
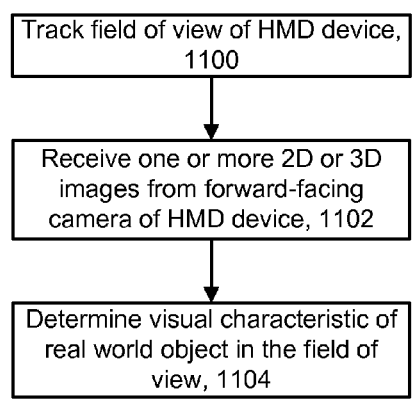
Fig. 12
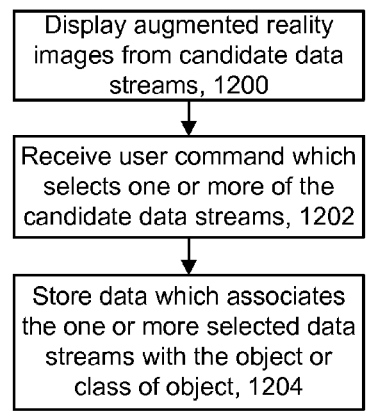
Fig. 13A
Fig. 13B
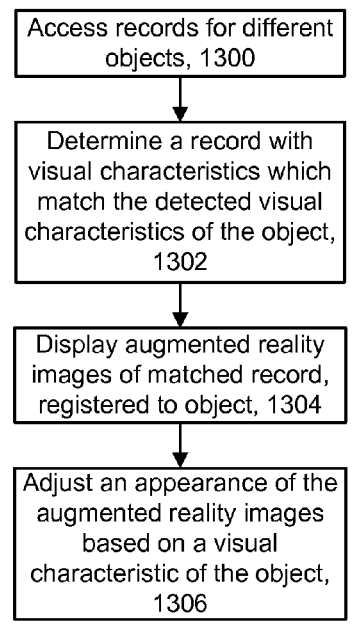

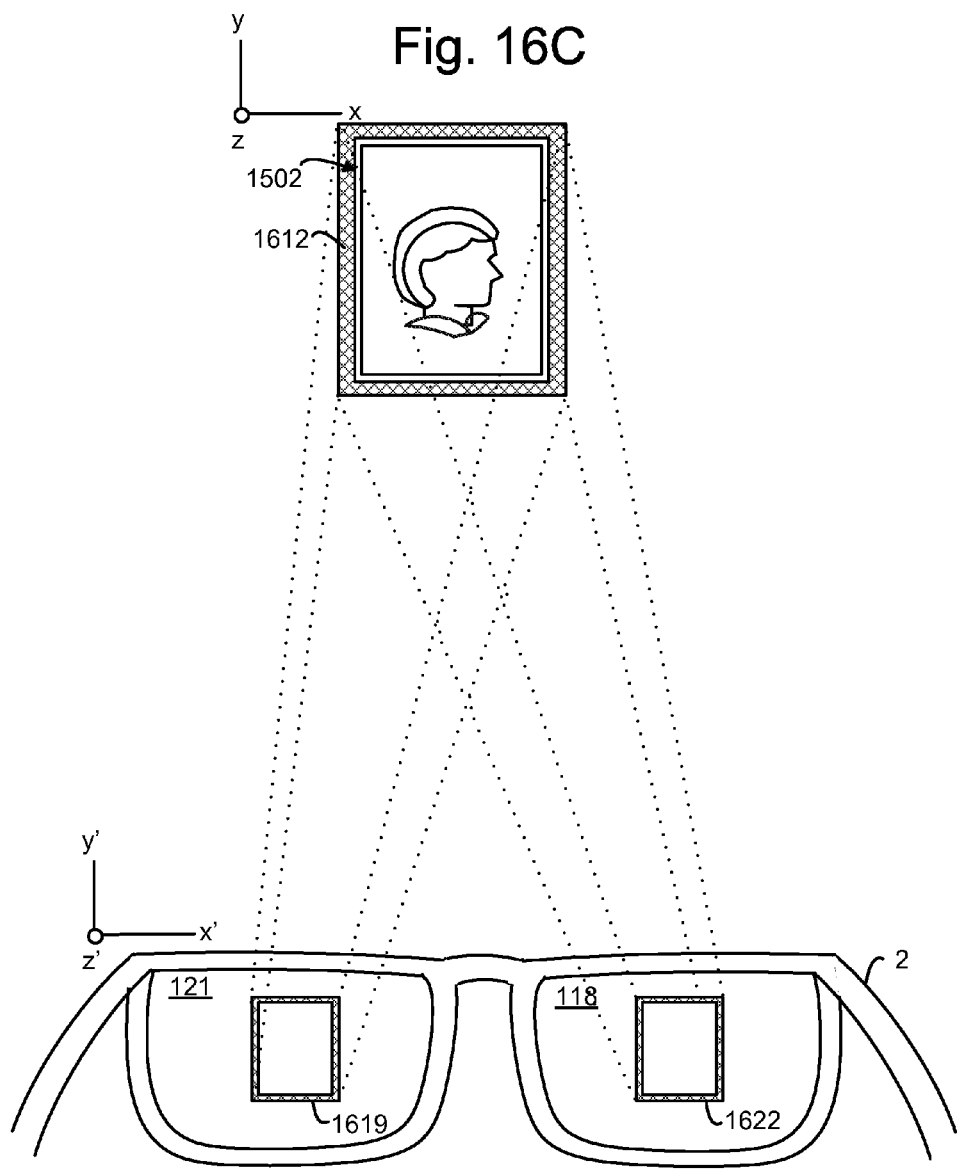

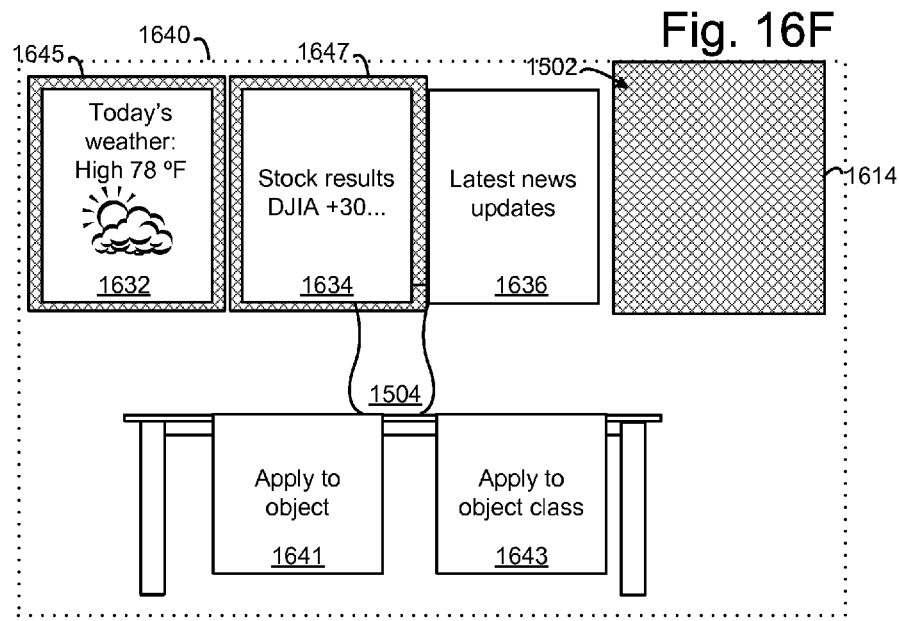
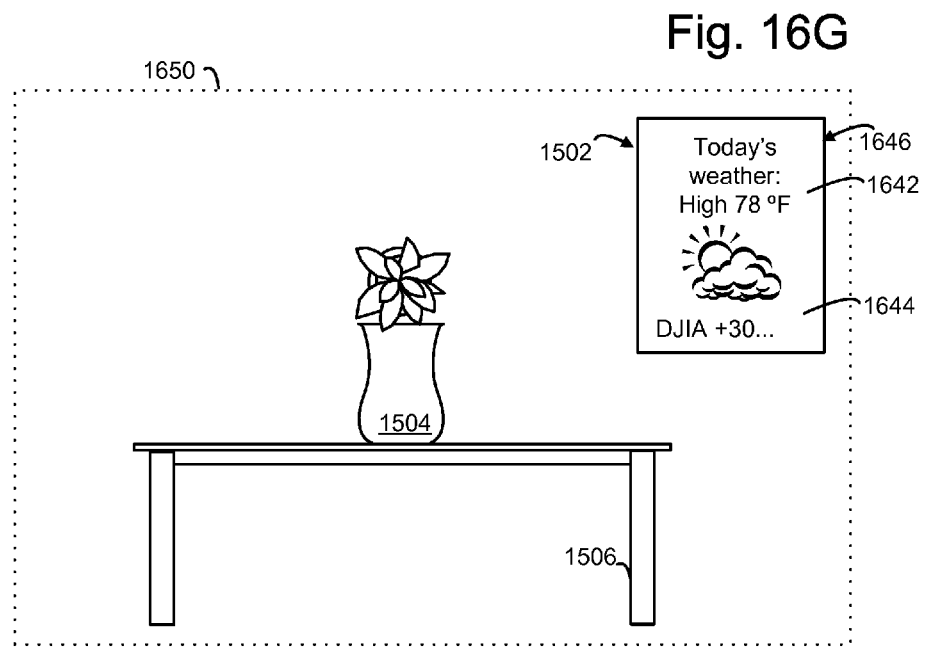

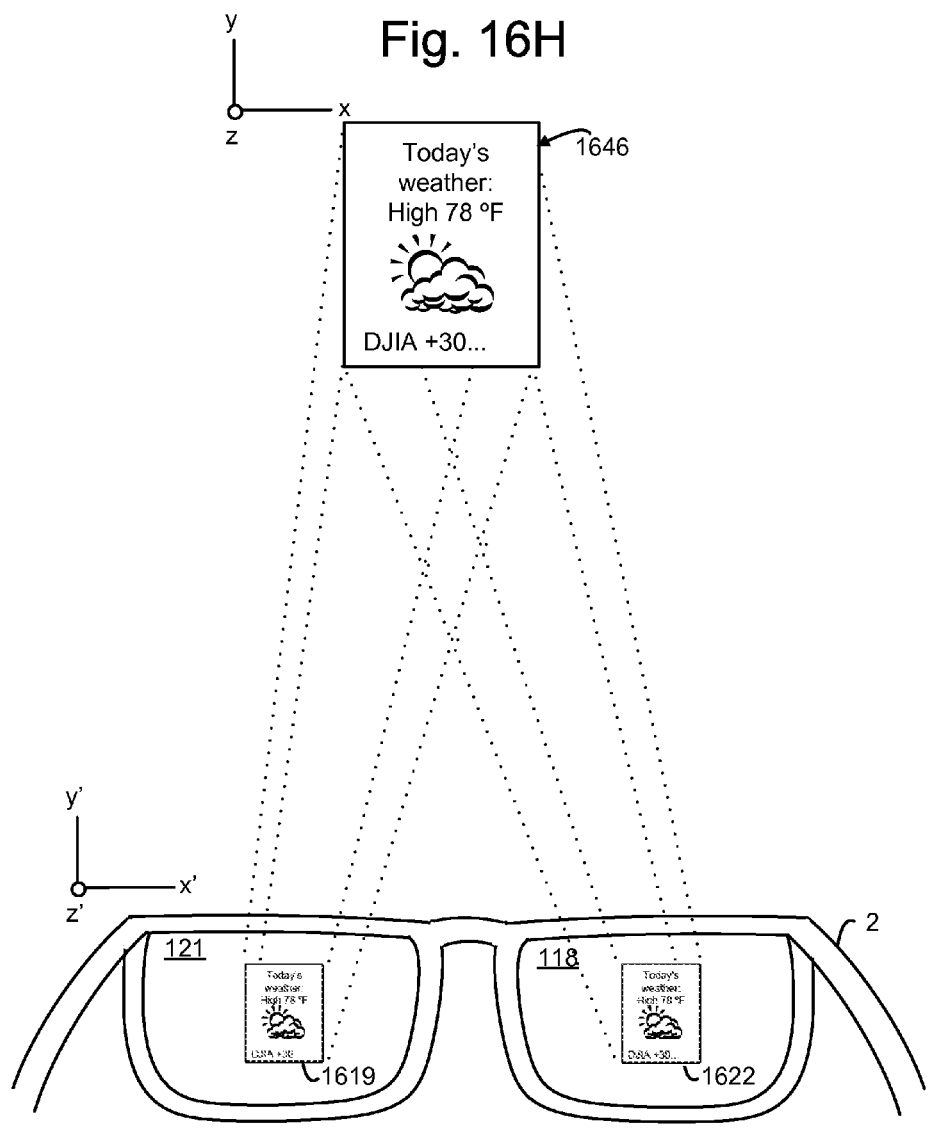

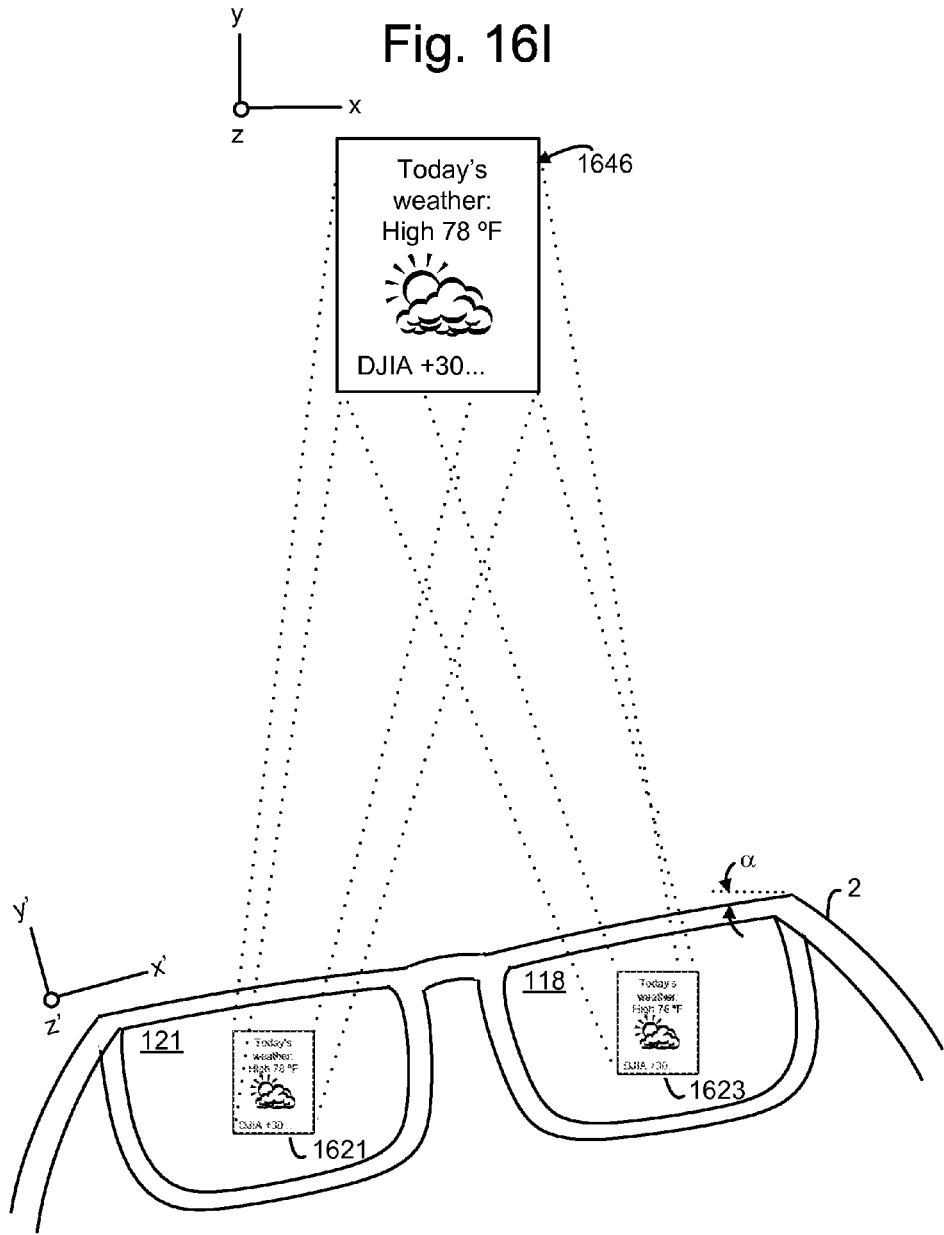

PORTALS: REGISTERED OBJECTS AS VIRTUALIZED, PERSONALIZED DISPLAYS

BACKGROUND

Head-mounted display (HMD) devices can be used in various applications, including military, aviation, medicine, video gaming, entertainment, sports, and so forth. See-through HMD devices allow the user to observe the physical world, while optical elements add light from one or more small micro-displays into the user's visual path, to provide an augmented reality image.

SUMMARY

A head mounted display (HMD) device is provided. The HMD may include associated electrical and optical components which allow a user to organize different streams of digital data which the user consumes by associating these streams with different real-world objects. The streams can be displayed to the user via the HMD when the HMD determines that the user is looking at a particular real-world object, or at a particular class of objects. As a result, an improvement is made in the user's ability to manage the different data streams and to associate them with corresponding objects in the real-world, so that the consumption of the digital streams becomes more natural. Moreover, an improvement is made in the ability of content providers associated with the digital streams to target the digital streams to particular users, geographic locations and/or objects. Further, a user can designate an object or class of objects to be associated with a data stream, designate a data stream to be associated with an object or class of objects, join a session such as a game session with other users, and designate whether a personal data stream should be displayed in place of a public data stream, where both data streams are associated with the same object or class of objects. The user can share a data stream which is associated with an object or class of objects, and can manipulate a display which is based on a data stream.

In one embodiment, an HMD device is provided which includes at least one see-through lens, at least one microdisplay, at least one forward-facing camera having a field of view, a location-detection device which determines a location of the user, and at least one control circuit. The at least one control circuit determines if at least one criterion is met based on the location. If the at least one criterion is met, the at least one control processes image data from the forward-facing camera to identify a real-world object in the field of view, identifies a data stream which is associated with the real-world object, and controls the at least one microdisplay to project augmented reality images from the data stream through the at least one see-through lens to at least one eye of the user, so that the augmented reality images are registered to the real-world object.

For example, the real-world object could be a picture frame hanging on a wall or standing on a table, a region of a wall in a home or office, a mirror, or a billboard. The data stream could be, e.g., a web page, game feed, video, stocker ticker, news or sports scores, or other source of static and/or dynamic images.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 9A depicts further details of step 802 of FIG. 8 for tracking a user of an HMD device.

FIG. 9B depicts further details of step 904 of FIG. 9A for tracking a user's eyes.

FIG. 9C depicts further details of step 906 of FIG. 9A for tracking a head orientation of a user.

FIG. 10 depicts further details of decision step 804 of FIG. 8 for determining if at least one criterion is met based on tracking of a user.

FIG. 11 depicts further details of decision step 806 of FIG. 8 for identifying a real-world object in a field of view of an HMD device.

FIG. 12 depicts further details of step 808 of FIG. 8 for associating one or more data streams with a real-world object.

FIG. 13A depicts further details of step 810 of FIG. 8 for displaying, on an HMD device, one or more data streams associated with a real-world object.

FIG. 13B depicts an example record associated with an object.

FIG. 16C depicts diagrammatically how the HMD device 2 provides the augmented reality image as the perimeter highlight 1612 of the object 1502 of FIG. 16B.

FIG. 16F depicts the scene of FIG. 16E in which the augmented reality images 1632 and 1634 are selected by the user.

FIG. 16G depicts the scene of FIG. 16B in which the object 1502 is replaced by augmented reality images from one or more data streams.

FIG. 16H depicts diagrammatically how the HMD device provides the augmented reality image of FIG. 16G, while the user's head has one orientation, so that the augmented reality images are registered to the object 1502.

FIG. 16I depicts diagrammatically how the HMD device provides the augmented reality image of FIG. 16G, while the user's head has another orientation, so that the augmented reality images continue to be registered to the object 1502.

DETAILED DESCRIPTION

Figure 1:
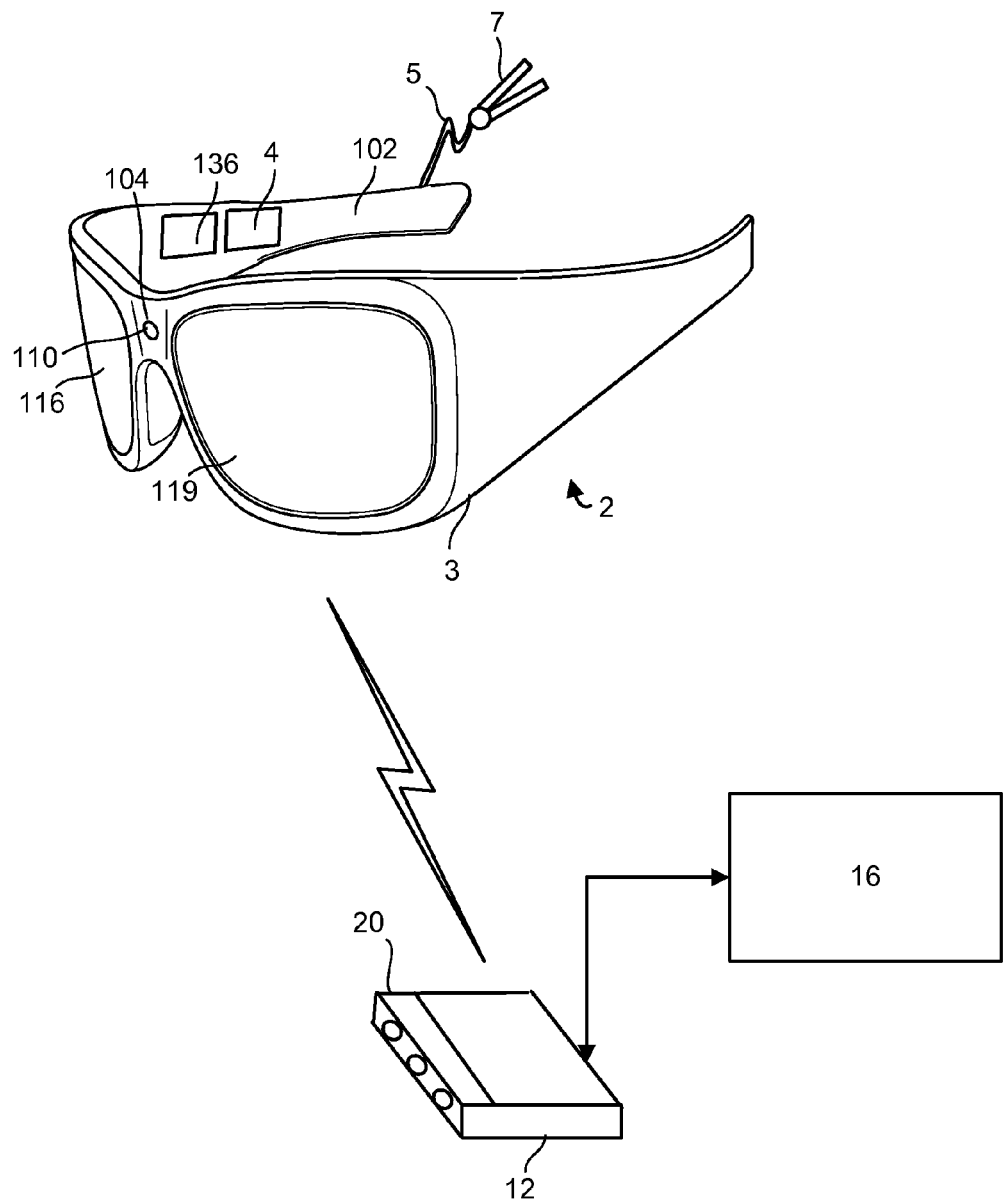
FIG. 1 is a block diagram depicting example components of one embodiment of an HMD device in communication with a hub computing system 12.

Generally, people who are interested in keeping track of digital data, e.g., anything on the Internet, digital photos, etc., have had to rely on physical screens to display this data. Large screens such as digital television screens or large computer monitors allow many types of data content to be displayed, but they are not portable. On the other hand, smaller portable screens such as on laptop computers and cell phones or other hand held devices, are typically only suitable for displaying a small number of different types of data content.

As described herein, see-through HMD devices can address this problem by providing portals into data content. See-through HMD devices can use optical elements such as mirrors, prisms, and holographic lenses to add light from one or two small micro-displays into a user's visual path. The light provides augmented reality images to the user's eyes via see-though lenses. The concept of portals allows the user to manage the content and placement of augmented reality images. Portals can take advantage of general classes of real-world objects (e.g., picture frames) as well as specific, registered real-world objects (e.g. "the picture frame at the end of the hallway") to provide additional "screen real estate" for displaying images to a user from a data stream. The data stream can be an always-on data stream, such as web cam images, a stock ticker, a website, a view into a channel for multiplayer gaming, and so forth.

This allows a user to view images from the data streams when looking at the object, but not at other times. In some cases, the viewing of the images is passive, such as when the user views a stock ticker or a web page with a weather forecast. In other case, the viewing can be interactive, such as when the user views a channel for multiplayer gaming to learn that a friend is playing a game, in response to which the user can enter a command to join in and participate in the game. The user can consume the digital content in a natural manner which is personalized to the user. For example, the user can glance at an object which has been associated with a data stream, such as a picture frame in the user's home. The picture frame becomes a portal into a digital experience. An object could also include a surface such as a particular wall. The object can even be an object that is itself capable of generating images, such as a television, when the object is in an off state. To other people who do not have an HMD device which has been configured to associate a data stream with the object, the picture frame simply holds a photo, for instance. Specific objects can be associated with specific information streams, or specific information streams can be attached to a class of objects. For instance, any circular object can be set to be a portal into a web news aggregator which has been selected by the user.

An object which is selected by the user to be a portal can be selected based on various criteria. For example, the object may be something that the user is not that interested in looking at. The object allows the user to see digital data in a natural way, where the data is in a fixed position in the physical world. In other examples, a fish tank becomes a stock ticker, a painting becomes a video stream from a nanny cam, a bathroom window becomes a spectator feed into friends' multiplayer gaming sessions, a closet doors glow red or blue to indicate the current outside temperature or weather forecast, a speed limit sign displays the current speed of the user's vehicle, and a billboard displays customized advertisements or personal messages which are set by the user.

FIG. 1 is a block diagram depicting example components of one embodiment of an HMD device. The HMD device 2 includes a head-mounted frame 3 which can be generally in the shape of an eyeglass frame, and includes temple 102 and 103, and a front lens frame including a nose bridge 104. Built into nose bridge 104 is a microphone 110 for recording sounds, including spoken user commands, and transmitting corresponding audio data to processing unit 4. Lenses 116 and 119 are a see-through lens.

The HMD device can be worn on the head of a user so that the user can see through a display and thereby see a real-world scene which includes an image which is not generated by the HMD device. The HMD device 2 can be self-contained so that all of its components are carried by, e.g., physically supported by, the frame 3. Optionally, one or more components of the HMD device are not carried by the frame. For example, one of more components which are not carried by the frame can be physically attached by a wire to a component carried by the frame. The clip-shaped sensor 7 attached by a wire 5, is one such example. The sensor 7 is a biological sensor such as a heart rate sensor which can be clipped to the user's ear. One example of a heart rate sensor emits infrared light at one side of the ear and senses, from the other side, the intensity of the light which is transmitted through the vascular tissue in the ear. There will be variations in the intensity due to variations in blood volume which correspond to the heart rate. Another example of a heart rate sensor attaches to the fingertip. Another example of a heart rate sensor uses a chest strap to detect EKG signals which can be transmitted wirelessly or by wire to receiving and processing circuitry of the HMD device. In addition to a level of the heart rate, e.g., the pulse rate, the regularity of the heart rate can be determined. A heart rate can be classified as regular or jittery, for instance. Heart rate could also be detected from images of the eye which are obtained from eye tracking camera 134B, described below.

Further, one of more components which are not carried by the frame can be in wireless communication with a component carried by the frame, and not physically attached by a wire or otherwise to a component carried by the frame. The one or more components which are not carried by the frame can be carried by the user, in one approach, such as on the wrist. For example, the processing unit 4 could be connected to a component in the frame via a wire or via a wireless link. The term "HMD device" can encompass both on-frame components and associated off-frame components.

The processing unit 4 includes much of the computing power used to operate HMD device 2. The processor may execute instructions stored on a processor readable storage device for performing the processes described herein. In one embodiment, the processing unit 4 communicates wirelessly (e.g., using Wi-Fi®, BLUETOOTH®, infrared (e.g., IrDA® or INFRARED DATA ASSOCIATION® standard), or other wireless communication means) with one or more hub computing systems 12 or to other HMDs or mobile devices such as cell phones.

Control circuits 136 provide various electronics that support the other components of the HMD device 2.

Hub computing system 12 may be a computer, a gaming system or console, or the like. According to an example embodiment, the hub computing system 12 may include hardware components and/or software components to execute applications such as gaming applications, non-gaming applications, or the like. The hub computing system 12 may include a processor that may execute instructions stored on a processor readable storage device for performing the processes described herein.

Hub computing system 12 further includes one or more capture devices, such as a capture device 20. The capture device 20 may be, for example, a camera that visually monitors one or more users and the surrounding space such that gestures and/or movements performed by the one or more users, as well as the structure of the surrounding space, may be captured, analyzed, and tracked to perform one or more controls or actions.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals.

Hub computing device 10, with capture device 20, may be used to recognize, analyze, and/or track human (and other types of) targets. For example, a user wearing the HMD device 2 may be tracked using the capture device 20 such that the gestures and/or movements of the user may be captured to animate an avatar or on-screen character and/or may be interpreted as controls that may be used to affect the application being executed by hub computing system 12.

The HMD device can similarly include a capture device to monitor gestures of the user, such as hand gestures, and convert these into commands.

Figure 2:
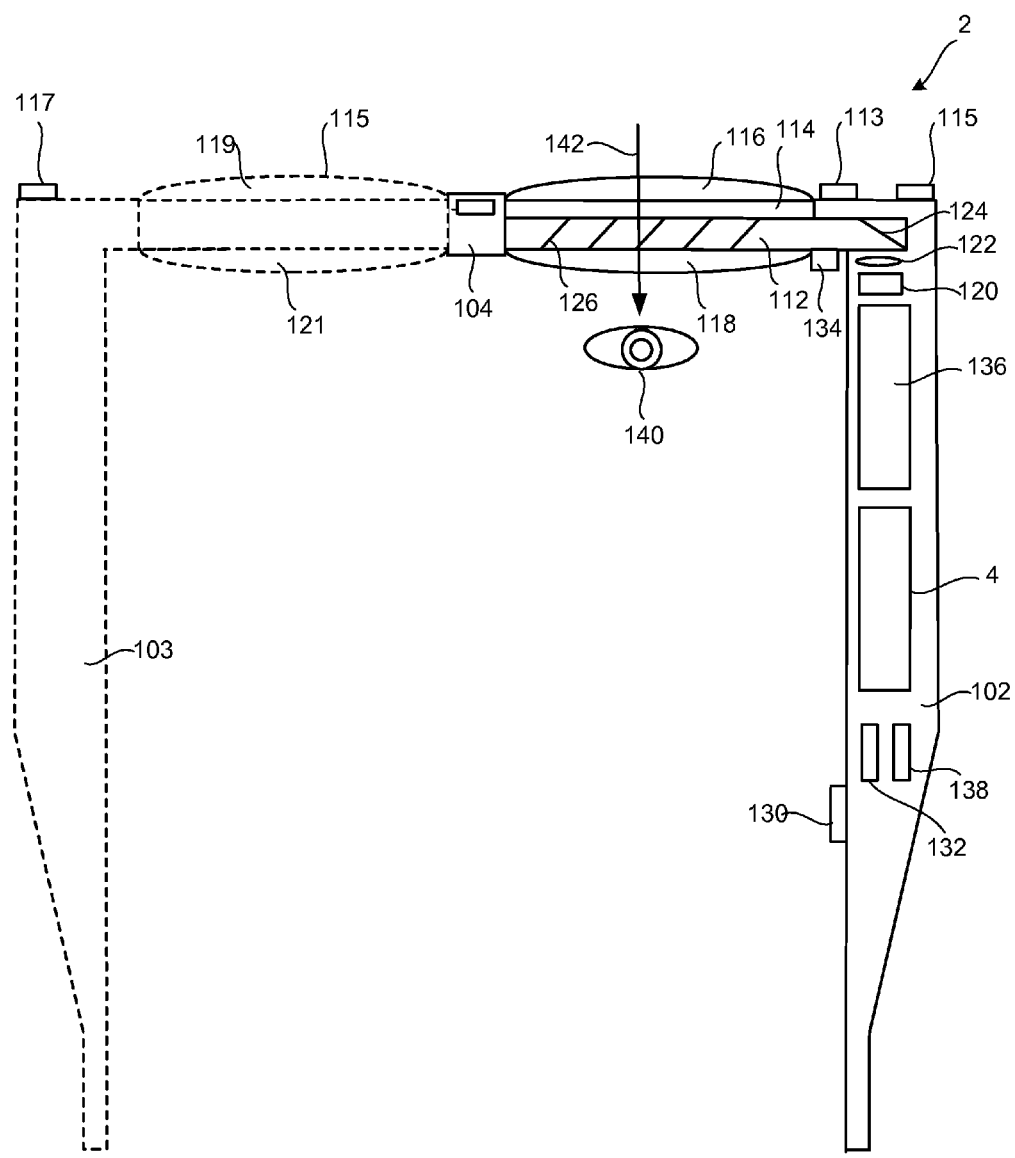
FIG. 2 is a top view of a portion of one embodiment of an HMD device.

FIG. 2 depicts a top view of a portion of HMD device 2, including a portion of the frame that includes temple 102 and nose bridge 104. Only the right side of HMD device 2 is depicted in detail. At the front of HMD device 2 are one or more forward- or room-facing cameras 113. The cameras can include at least one visible light video camera 113 that can capture video and still images, and transmit the images to processing unit 4, as described below. Also, a depth sensor can be formed by the combination of an infrared emitter 115 and an infrared sensor/detector 117. The visible light video camera 113 may also be part of the depth sensor. The depth sensor may operate in a manner similar to the capture device 20 of the hub computing device 12 as explained in connection with FIG. 5. The forward-facing video camera 113 faces outward and has a viewpoint similar to that of the user.

A portion of the frame of HMD device 2 surrounds a display that includes one or more lenses. To show the components of HMD device 2, a portion of the frame surrounding the display is not depicted. The display includes a light guide optical element 112, opacity filter 114, a front, right-side see-through lens 116 and a rear, right-side see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the augmented reality imagery. Light guide optical element 112 channels artificial light to the eye.

Similarly, the left side of the HMD includes a front, left-side see-through lens 119 and a rear, left-side see-through lens 121.

Mounted to or inside temple 102 is an image source, which (in one embodiment) includes microdisplay 120 for projecting an augmented reality image and lens 122 for directing images from microdisplay 120 into light guide optical element 112. In one embodiment, lens 122 is a collimating lens. An augmented reality emitter can include microdisplay 120, one or more optical components such as the lens 122 and light guide 112, and associated electronics such as a driver. Such an augmented reality emitter is associated with the HMD device, and emits light to a user's eye, where the light represents augmented reality still or video images.

Figure 3:
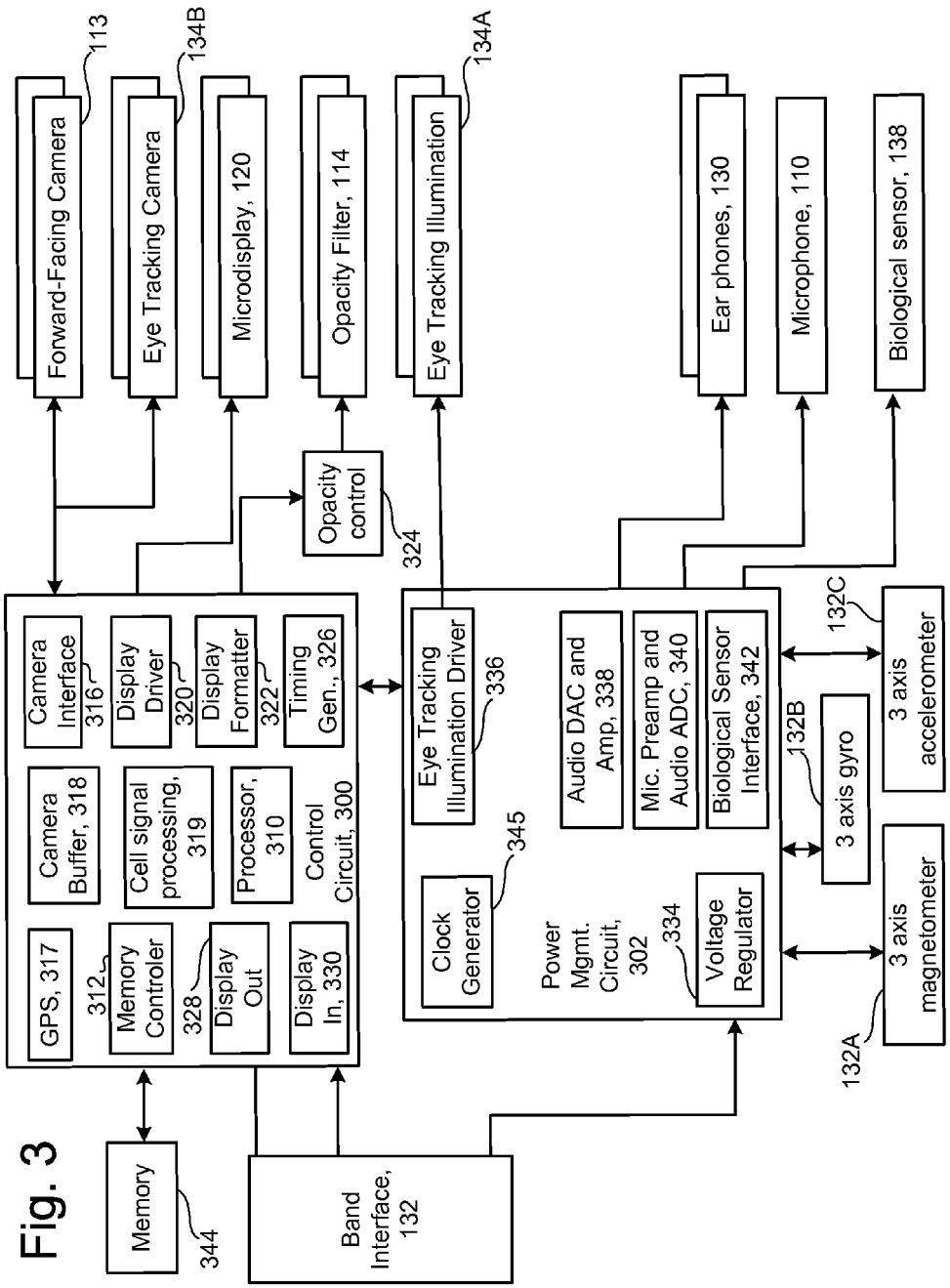
FIG. 3 is a block diagram of one embodiment of the components of an HMD device.

Control circuits 136, discussed further in connection with FIG. 3, provide various electronics that support the other components of HMD device 2. Inside, or mounted to temple 102, are ear phones 130, inertial sensors 132 and biological metric sensor 138. For example, the biological sensor can represent the heart rate sensor components 5 and 7 of FIG. 1. Other biological sensors could be provided to detect a biological metric such as body temperature, blood pressure or blood glucose level. Characteristics of the user's voice such as pitch or rate of speech can also be considered to be biological metrics. The eye tracking camera 134B can also detect a biological metric such as pupil dilation amount in one or both eyes. Heart rate could also be detected from images of the eye which are obtained from eye tracking camera 134B. In one embodiment, inertial sensors 132 include a three axis magnetometer 132A, three axis gyro 132B and three axis accelerometer 132C (See FIG. 3). The inertial sensors are for sensing position, orientation, sudden accelerations of HMD device 2. For example, the inertial sensors can be one or more sensors which are used to determine an orientation and/or location of user's head.

Microdisplay 120 projects an image through lens 122. Different image generation technologies can be used. For example, with a transmissive projection technology, the light source is modulated by optically active material, and backlit with white light. These technologies are usually implemented using LCD type displays with powerful backlights and high optical energy densities. With a reflective technology, external light is reflected and modulated by an optically active material. The illumination is forward lit by either a white source or RGB source, depending on the technology. Digital light processing (DGP), liquid crystal on silicon (LCOS) and MIRASOL® (a display technology from QUALCOMM®, INC.) are all examples of reflective technologies which are efficient as most energy is reflected away from the modulated structure. With an emissive technology, light is generated by the display. For example, a PicoP™-display engine (available from MICROVISION, INC.) emits a laser signal with a micro mirror steering either onto a tiny screen that acts as a transmissive element or beamed directly into the eye.

Light guide optical element 112 transmits light from microdisplay 120 to the eye 140 of the user while allowing light from in front of the HMD device 2 to be transmitted through light guide optical element 112 to eye 140, as depicted by arrow 142, allowing the user to have an actual direct view of the space in front of HMD device 2, in addition to receiving an augmented reality image from microdisplay 120. Thus, the walls of light guide optical element 112 are see-through. Light guide optical element 112 includes a first reflecting surface 124 (e.g., a mirror or other surface). Light from microdisplay 120 passes through lens 122 and is incident on reflecting surface 124, which reflects the incident light such that light is trapped inside a planar, substrate comprising light guide optical element 112 by internal reflection. After several reflections off the surfaces of the substrate, the trapped light waves reach an array of selectively reflecting surfaces, including example surface 126.

Reflecting surfaces 126 couple the incident light waves out of the substrate into the eye 140 of the user. Different light rays will travel and bounce off the inside of the substrate at different angles as they hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Pat. No. 7,672,055, titled "Substrate-guided optical devices," incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device. A see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. A transmissivity can be set for each pixel by the opacity filter control circuit 224, described below. More details of an opacity filter are provided in U.S. patent application Ser. No. 12/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking (e.g., using eye tracking camera 134) can be employed to compute the correct image offset at the extremities of the viewing field.

Figure 4:
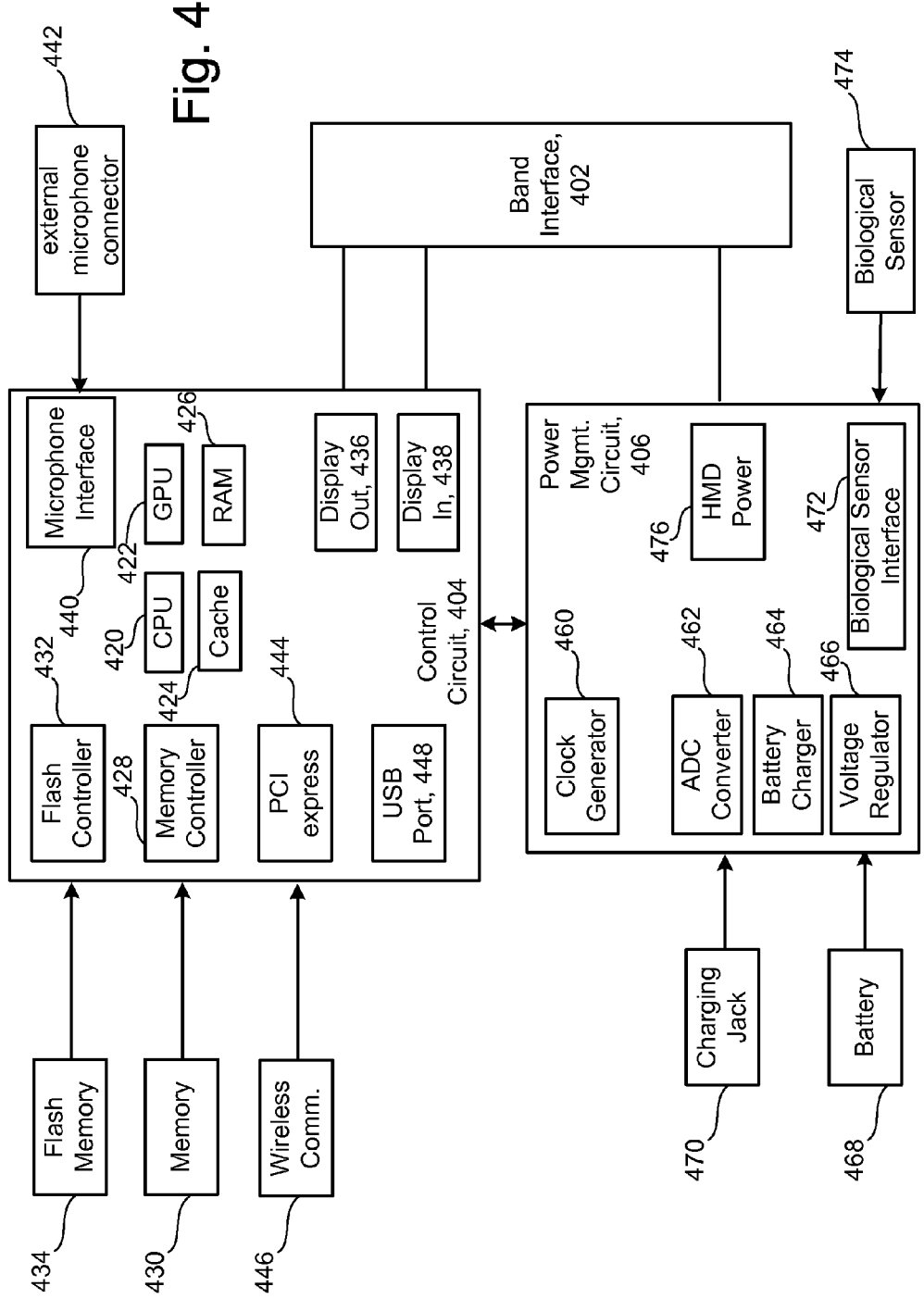
FIG. 4 is a block diagram of one embodiment of the components of a processing unit of an HMD device.

FIG. 3 is a block diagram depicting the various components of HMD device 2. FIG. 4 is a block diagram describing the various components of processing unit 4. The HMD device components include many sensors that track various conditions. The HMD device will receive instructions about the augmented reality image from processing unit 4 and will provide the sensor information back to processing unit 4. Processing unit 4, the components of which are depicted in FIG. 4, will receive the sensory information of the HMD device 2. Optionally, the processing unit 4 also receives sensory information from hub computing device 12 (See FIG. 1). Based on that information, and/or other criterion as described herein, processing unit 4 will determine where and when to provide an augmented reality image to the user and send instructions accordingly to the HMD device of FIG. 3.

Note that some of the components of FIG. 3 (e.g., forward-facing camera 113, eye tracking camera 134B, microdisplay 120, opacity filter 114, eye tracking illumination 134A and earphones 130) are shown in shadow to indicate that there are two of each of those devices, one for the left side and one for the right side of HMD device. Regarding the forward-facing camera 113, in one approach, one camera is used to obtain images using visible light.

In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12 (see also capture device 20 of FIG. 5).

Images from forward-facing cameras can be used to identify people, hand gestures and other objects in a field of view of the user. For example, it can be determined when the user makes a hand gesture such as pointing at an object. The real-world object can be identified and associated with a data stream, or used as the location to display a previously-associated data stream.

FIG. 3 shows the control circuit 300 in communication with the power management circuit 302. Control circuit 300 includes processor 310, memory controller 312 in communication with memory 344 (e.g., DRAM), camera interface 316, camera buffer 318, display driver 320, display formatter 322, timing generator 326, display out interface 328, and display in interface 330. A GPS circuit 317 and/or a cell signal processing circuit 319 can be used to identify the location of the HMD device and the user. In one approach, the GPS circuit 317 and/or the cell signal processing circuit 319 process respective signals which are received by one or more antennas of the HMD device. In another approach, the HMD device receives location data from GPS and/or a cell signal processing circuits of other computing devices, such as a cell phone of the user or the hub computing device. The HMD device can also receive location-aware network data to determine location data, or receive location data which is determined by another computing device. A cell signal processing circuit determines location information using signals from one or more cell phone towers.

Location-aware network information is obtained by sensing electromagnetic (EM) signals which are present in a location and correlating the signals with a location. For example, the location can be learned from an identifier of a wireless local area network (WLAN), such as an SSID of a Wi-Fi® signal. The SSID can be used to access a database which yields the corresponding location. Skyhook Wireless, Boston, Mass., provides a Wi-Fi® Positioning System (WPS) in which a database of Wi-Fi® networks is cross-referenced to latitude, longitude coordinates and place names for use in location-aware applications for cell phones and other mobile devices. Or, the wireless network can be recognized as one which is in a known location such as the user's home or office, when the HMD connects to the network. In this case, a relative location of the HMD device can be used.

A combination of location-detecting techniques can be used as well. For example, see US2009/0312035, titled "Methods And Systems For Determining Location Using A Cellular And WLAN Positioning System By Selecting The Best Cellular Positioning System Solution," incorporated herein by reference.

Another option to determine location uses aggregated depth mapping, in which a depth map of an environment of the user is saved and used as an identifier of the location. For example, a depth map of a user's living room can be made, where the depth map identifies walls, furniture and so forth which characterize the room. If a similar depth map is seen at a later time, it can be concluded that the user is in the same location. An aggregated depth map combines multiple depth maps such as from different perspectives of a room, home or other environment, to essentially provide a 3d model of the environment.

In one embodiment, all of components of control circuit 300 are in communication with each other via dedicated lines or one or more buses. In another embodiment, each of the components of control circuit 300 is in communication with processor 310. Camera interface 316 provides an interface to the two forward-facing cameras 113 and stores images received from the forward-facing cameras in camera buffer 318. Display driver 320 drives microdisplay 120. Display formatter 322 provides information, about the augmented reality image being displayed on microdisplay 120, to opacity control circuit 324, which controls opacity filter 114. Timing generator 326 is used to provide timing data for the system. Display out interface 328 is a buffer for providing images from forward-facing cameras 112 to the processing unit 4. Display in interface 330 is a buffer for receiving images such as an augmented reality image to be displayed on microdisplay 120.

Display out interface 328 and display in interface 330 communicate with band interface 332 which is an interface to processing unit 4, when the processing unit is attached to the frame of the HMD device by a wire, or communicates by a wireless link, and is worn on the wrist of the user on a wrist band. This approach reduces the weight of the frame-carried components of the HMD device. In other approaches, as mentioned, the processing unit can be carried by the frame and a band interface is not used.

Power management circuit 302 includes voltage regulator 334, eye tracking illumination driver 336, audio DAC and amplifier 338, microphone preamplifier audio ADC 340, biological sensor interface 342 and clock generator 345. Voltage regulator 334 receives power from processing unit 4 via band interface 332 and provides that power to the other components of HMD device 2. Eye tracking illumination driver 336 provides the infrared (IR) light source for eye tracking illumination 134A, as described above. Audio DAC and amplifier 338 receives the audio information from earphones 130. Microphone preamplifier and audio ADC 340 provides an interface for microphone 110. Biological sensor interface 342 is an interface for biological sensor 138. Power management unit 302 also provides power and receives data back from three-axis magnetometer 132A, three-axis gyroscope 132B and three axis accelerometer 132C.

FIG. 4 is a block diagram describing the various components of processing unit 4. Control circuit 404 is in communication with power management circuit 406. Control circuit 404 includes a central processing unit (CPU) 420, graphics processing unit (GPU) 422, cache 424, RAM 426, memory control 428 in communication with memory 430 (e.g., DRAM), flash memory controller 432 in communication with flash memory 434 (or other type of non-volatile storage), display out buffer 436 in communication with HMD device 2 via band interface 402 and band interface 332 (when used), display in buffer 438 in communication with HMD device 2 via band interface 402 and band interface 332 (when used), microphone interface 440 in communication with an external microphone connector 442 for connecting to a microphone, Peripheral Component Interconnect (PCI) express interface 444 for connecting to a wireless communication device 446, and USB port(s) 448.

In one embodiment, wireless communication component 446 can include a Wi-Fi® enabled communication device, BLUETOOTH® communication device, infrared communication device, etc. The wireless communication component 446 is a wireless communication interface which, in one implementation, receives data in synchronism with the content displayed by the audiovisual device 16. Further, augmented reality images may be displayed in response to the received data. In one approach, such data is received from the hub computing system 12, a local Wi-Fi® network or WLAN, a cell phone network, a local storage device or other source.

The USB port can be used to dock the processing unit 4 to hub computing device 12 to load data or software onto processing unit 4, as well as charge processing unit 4. In one embodiment, CPU 420 and GPU 422 are the main workhorses for determining where, when and how to insert augmented reality images into the view of the user.

Power management circuit 406 includes clock generator 460, analog to digital converter 462, battery charger 464, voltage regulator 466, HMD power source 476, and biological sensor interface 472 in communication with biological sensor 474. Analog to digital converter 462 is connected to a charging jack 470 for receiving an AC supply and creating a DC supply for the system. Voltage regulator 466 is in communication with battery 468 for supplying power to the system. Battery charger 464 is used to charge battery 468 (via voltage regulator 466) upon receiving power from charging jack 470. HMD power source 476 provides power to the HMD device 2.

The calculations that determine where, how and when to insert an augmented reality image can be performed by the HMD device 2, and/or by a computing device which is in communication with the HMD device.

In one example embodiment, the HMD device will create a model of the environment that the user is in and track various objects in that environment, based on the field of view of the HMD device. The model and the tracking information are provided to processing unit 4. Sensor information obtained by HMD device 2 is transmitted to processing unit 4. Processing unit 4 refines the field of view of the user and provide instructions to HMD device 2 on how, where and when to insert augmented reality images.

Figure 5:
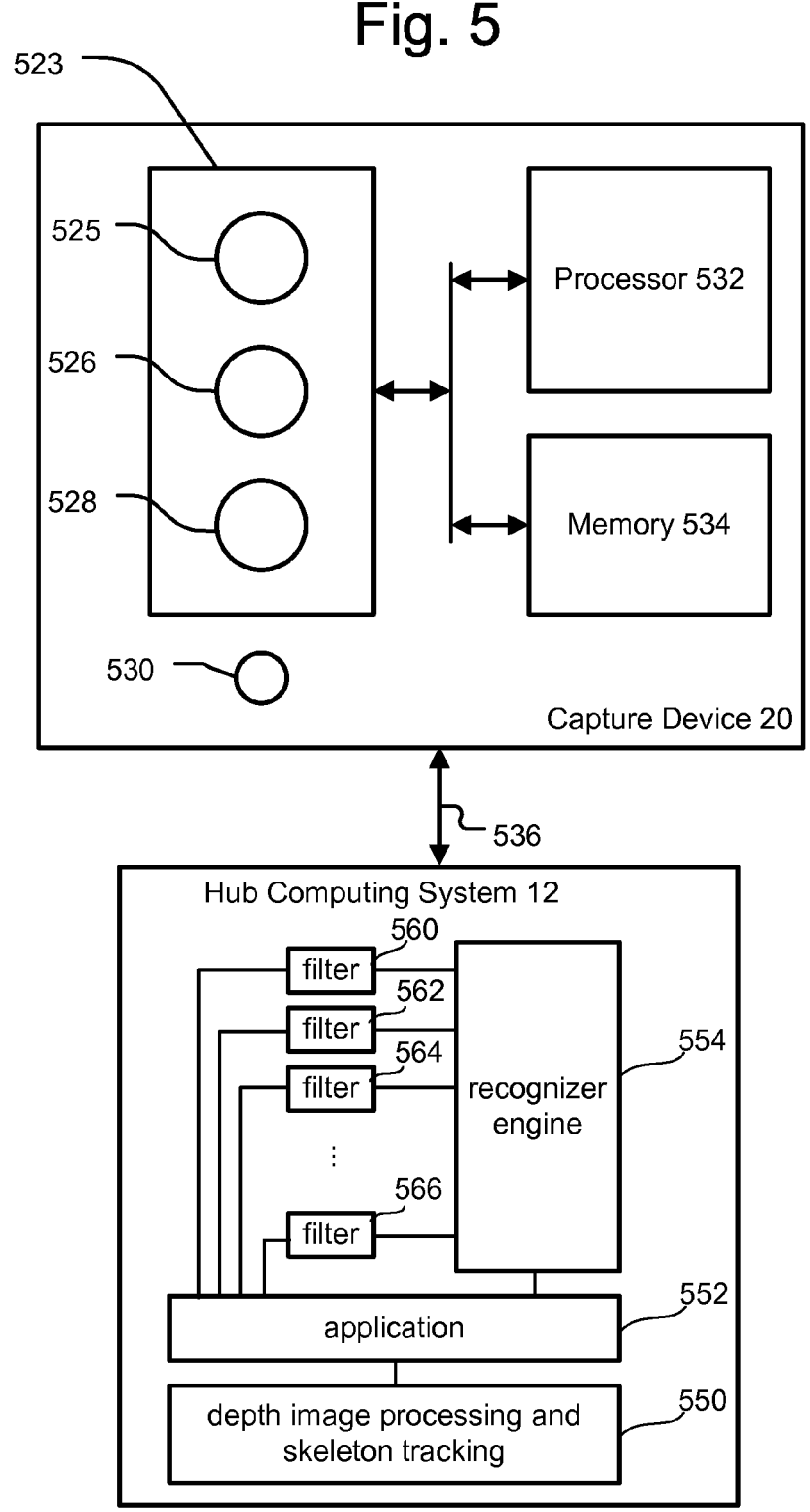
FIG. 5 is a block diagram of one embodiment of the components of the hub computing system 12 and the capture device 20 of FIG. 1.

FIG. 5 illustrates an example embodiment of the hub computing system 12 and the capture device 20 of FIG. 1. The HMD device can have essentially the same functionality as the capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

Capture device 20 may include a camera component 523, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 523 may include an infrared (IR) light component 525, an infrared camera/sensor 526, and an RGB (visual image) camera 528 that may be used to capture the depth image of a scene. A 3-D camera is formed by the combination of the infrared emitter 24 and the infrared camera 26. For example, in time-of-flight analysis, the IR light component 525 may emit an infrared light onto the scene and may then use sensors (in some embodiments, including sensors not shown) to detect the backscattered light from the surface of one or more targets and objects in the scene using, for example, the 3-D camera 526 and/or the RGB camera 528. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, the phase of the outgoing light wave may be compared to the phase of the incoming light wave to determine a phase shift. The phase shift may then be used to determine a physical distance from the capture device to a particular location on the targets or objects.

A time-of-flight analysis may be used to indirectly determine a physical distance from the capture device 20 to a particular location on the targets or objects by analyzing the intensity of the reflected beam of light over time via various techniques including, for example, shuttered light pulse imaging.

The capture device 20 may use a structured light to capture depth information. In such an analysis, patterned light (i.e., light displayed as a known pattern such as grid pattern, a stripe pattern, or different pattern) may be projected onto the scene via, for example, the IR light component 525. Upon striking the surface of one or more targets or objects in the scene, the pattern may become deformed in response. Such a deformation of the pattern may be captured by, for example, the 3-D camera 526 and/or the RGB camera 528 (and/or other sensor) and may then be analyzed to determine a physical distance from the capture device to a particular location on the targets or objects. In some implementations, the IR light component 525 is displaced from the cameras 526 and 528 so triangulation can be used to determined distance from cameras 526 and 528. In some implementations, the capture device 20 will include a dedicated IR sensor to sense the IR light, or a sensor with an IR filter.

The capture device 20 may include two or more physically separated cameras that may view a scene from different angles to obtain visual stereo data that may be resolved to generate depth information. Other types of depth image sensors can also be used to create a depth image.

The capture device 20 may further include a microphone 530, which includes a transducer or sensor that may receive and convert sound into an electrical signal. Microphone 530 may be used to receive audio signals that may also be provided by hub computing system 12.

A processor 532 is in communication with the image camera component 523. Processor 532 may include a standardized processor, a specialized processor, a microprocessor, or the like that may execute instructions including, for example, instructions for receiving a depth image, generating the appropriate data format (e.g., frame) and transmitting the data to hub computing system 12.

A memory 534 stores the instructions that are executed by processor 532, images or frames of images captured by the 3-D camera and/or RGB camera, or any other suitable information, images, or the like. According to an example embodiment, memory 534 may include RAM, ROM, cache, flash memory, a hard disk, or any other suitable storage component. Memory 534 may be a separate component in communication with the image capture component 523 and processor 532. According to another embodiment, the memory 534 may be integrated into processor 532 and/or the image capture component 523.

Capture device 20 is in communication with hub computing system 12 via a communication link 536. The communication link 536 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 536. Additionally, the capture device 20 provides the depth information and visual (e.g., RGB or other color) images captured by, for example, the 3-D camera 526 and/or the RGB camera 528 to hub computing system 12 via the communication link 536. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 550, which uses the depth images to track one or more persons detectable by the depth camera function of capture device 20. Module 550 provides the tracking information to application 552, which can be a video game, productivity application, communications application or other software application etc. The audio data and visual image data is also provided to application 552 and module 550. Application 552 provides the tracking information, audio data and visual image data to recognizer engine 554. In another embodiment, recognizer engine 554 receives the tracking information directly from module 550 and receives the audio data and visual image data directly from capture device 20.

Recognizer engine 554 is associated with a collection of filters 560, 562, 564, . . . , 566 each comprising information concerning a gesture, action or condition that may be performed by any person or object detectable by capture device 20. For example, the data from capture device 20 may be processed by filters 560, 562, 564, . . . , 566 to identify when a user or group of users has performed one or more gestures or other actions. Those gestures may be associated with various controls, objects or conditions of application 552. Thus, hub computing system 12 may use the recognizer engine 554, with the filters, to interpret and track movement of objects (including people). The movement can include gestures such as hand gestures which are interpreted as commands.

Capture device 20 provides RGB images (or visual images in other formats or color spaces) and depth images to hub computing system 12. The depth image may be a set of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements.

Figure 6:
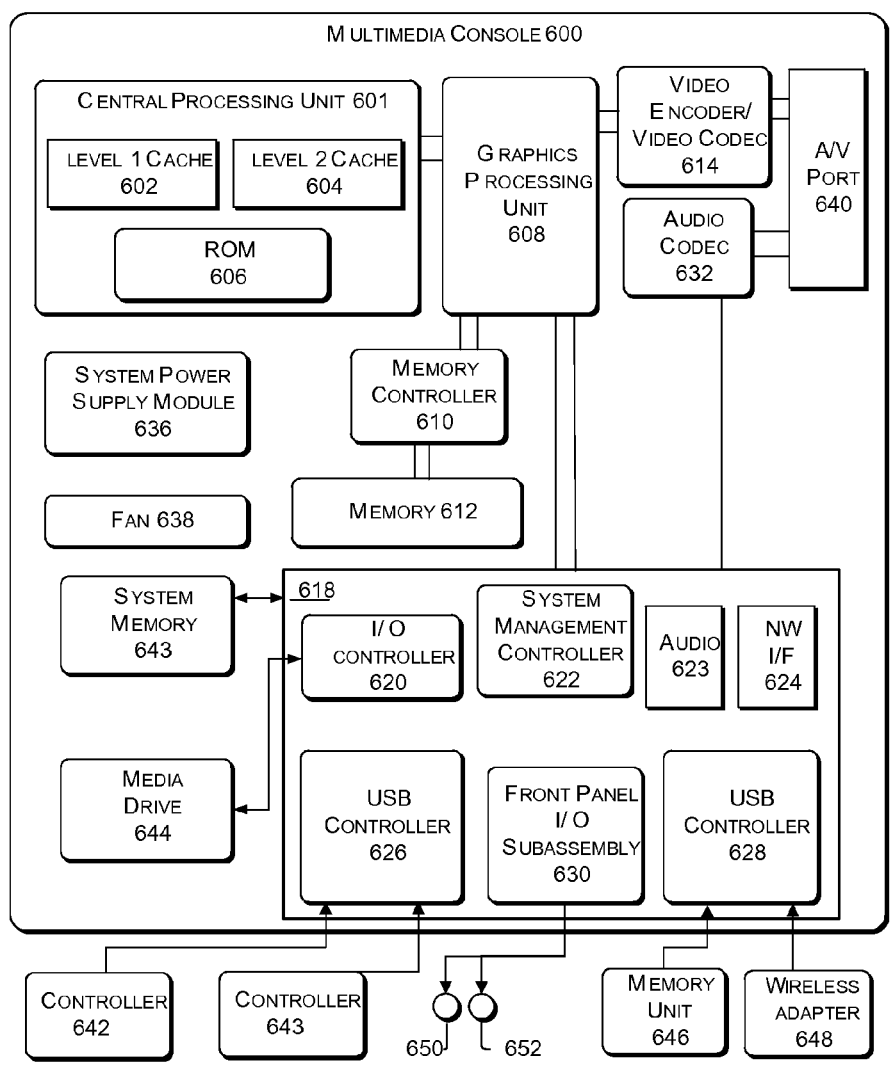
FIG. 6 is a block diagram of one embodiment of a computing system that can be used to implement the hub computing system 12 described herein.

FIG. 6 illustrates an example embodiment of a computing system that may be used to implement hub computing system 12. As shown in FIG. 6, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. CPU 601 may be provided having more than one core, and thus, additional level 1 and level 2 caches 602 and 604. The flash ROM 606 may store executable code that is loaded during an initial phase of a boot process when the multimedia console 600 is powered on.

A GPU 608 and a video encoder/video codec (coder/decoder) 614 form a video processing pipeline for high speed and high resolution graphics processing. Data is carried from the graphics processing unit 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, e.g., RAM.

The multimedia console 600 includes an I/O controller 620, a system management controller 622, an audio processing unit 623, a network (NW) interface (I/F) 624, a first USB host controller 626, a second USB controller 628 and a front panel I/O subassembly 630 that are preferably implemented on a module 618. The USB controllers 626 and 628 serve as hosts for peripheral controllers 642 and 643, a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a BLUETOOTH® module, a cable modem, and the like.

System memory 643 is provided to store application data that is loaded during the boot process. A media drive 644 is provided and may comprise a DVD/CD drive, Blu-Ray Disk™ drive, hard disk drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394 serial bus interface).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio user or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. Such architectures can include a PCI bus, PCI-Express bus, etc.

When the multimedia console 600 is powered on, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community. Additionally, multimedia console 600 can communicate with processing unit 4 via wireless adaptor 648.

FIG. 1, discussed previously, depicts one HMD device 2 (considered to be a type of mobile terminal) in communication with one hub computing device 12 (referred to as a hub). In another embodiment, multiple mobile terminals can be in communication with a single hub. Other types of mobile devices can include, e.g., cell phones, laptops, tablets, PCs and PDAs. Each of the mobile terminals will communicate with the hub using wireless communication, as described above. In such an embodiment, much of the information that is useful to all of the mobile terminals can be computed and stored at the hub and transmitted to each of the mobile terminals. For example, the hub will generate the model of the environment and provide that model to all of the mobile terminals in communication with the hub. Additionally, the hub can track the location and orientation of the mobile terminals and of the moving objects in the room, and then transfer that information to each of the mobile terminals.

Figure 7:
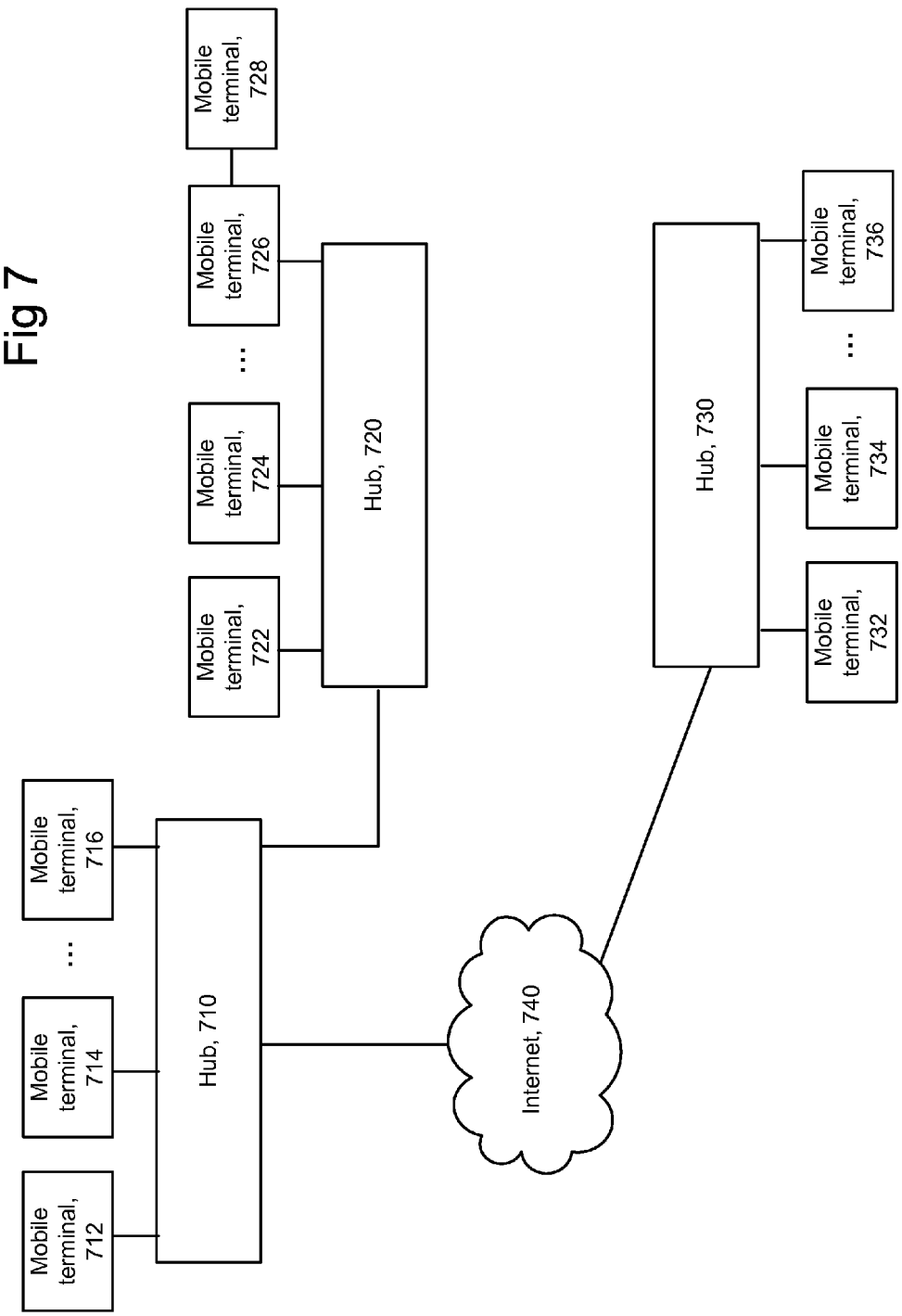
FIG. 7 is a block diagram depicting a multi-user system.

The system could include multiple hubs, with each hub including one or more mobile terminals. The hubs can communicate with each other directly or via the Internet (or other networks). For example, FIG. 7 is a block diagram depicting a multi-user system, including hubs 710, 720 and 730. Hub 710 communicates directly to hub 720. Hub 710 communicates to hub 730 via the Internet. Hub 710 communicated with mobile terminals 712, 714, . . . , 716. Hub 720 communicates with mobile terminals 722, 724, . . . , 726. Hub 730 communicates with mobile terminals 732, 734, . . . , 736. Each of the mobile terminals communicates with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile terminals. Sensor information for the mobile terminals will be provided to their respective hubs and then shared with the other hubs for eventual sharing to the other mobile terminals. Thus, information shared between hubs can include skeleton tracking, information about the models, various states of applications, and other tracking. The information communicated between the hubs and their respective mobile terminals include tracking information of moving objects, the state and physics updates for the world models, geometry and texture information, video and audio, and other information used to perform the operations described herein.

Additionally, mobile terminals can communicate directly with one another, such as mobile terminals 726 and 728. Also, the mobile terminals can be of the same or different types. In one example, the mobile terminals 726 and 728 are HMD devices worn by respective users that communicate via, e.g., a Wi-Fi®, BLUETOOTH® or IrDA® link. In another example, mobile terminal 726 is an HMD device and the mobile terminal 728 is a cell phone (or tablet or PC) which communicates via Wi-Fi®, BLUETOOTH® or IrDA® link. In another approach, mobile terminal 726 as an HMD device could communicate with mobile terminal 724 as a cell phone via the hub 720 using, e.g., Wi-Fi®, BLUETOOTH® or IrDA® link. In a BLUETOOTH® implementation, terminals 724 and 726 could be slave devices of the hub 720 as a master device, so that the terminals 724 and 726 exchange messages via the hub 720.

At least one control circuit/processor can be provided, e.g., by the hub computing system 12, processing unit 4, control circuit 136, processor 610, CPU 420, GPU 422, processor 532 and/or console 600. The at least one control circuit/processor may execute instructions stored on one or more tangible, non-transitory processor-readable storage devices for achieving the functionality described herein. The storage device, as a computer- or processor-readable media, can be provided, e.g., by memory 344, cache 424, RAM 426, flash memory 434, memory 430, memory 534, memory 612, cache 602 or 604, memory 643 and/or memory unit 646

A hub can also communicate data, e.g., wirelessly, to an HMD device for rendering an augmented reality image from a perspective of the user, based on a current orientation and/or location of the user's head which is transmitted to the hub. The data for rendering the augmented reality image can be in synchronism with content displayed on a video display screen. In one approach, the data for rendering the augmented reality image includes image data for controlling pixels of the augmented reality display to provide an augmented reality image registered to a real-world object, which can be static or moving. The augmented reality image can include a 2-D or 3-D object as discussed further below which is rendered from the user's current perspective. The image data for controlling pixels of the augmented reality display can be in a specified file format, for instance, where individual frames of images are specified.

Furthermore, the hub can communicate data to the HMD device for rendering an augmented reality image. In another approach, the image data for rendering the augmented reality image is obtained from another source than the hub, such as via a local storage device which is included with the HMD or perhaps carried by the user's person, e.g., in a pocket or arm band, and connected to the head-mounted via a wire or wirelessly, or via a link to a cell phone network or WLAN.

Figure 8:
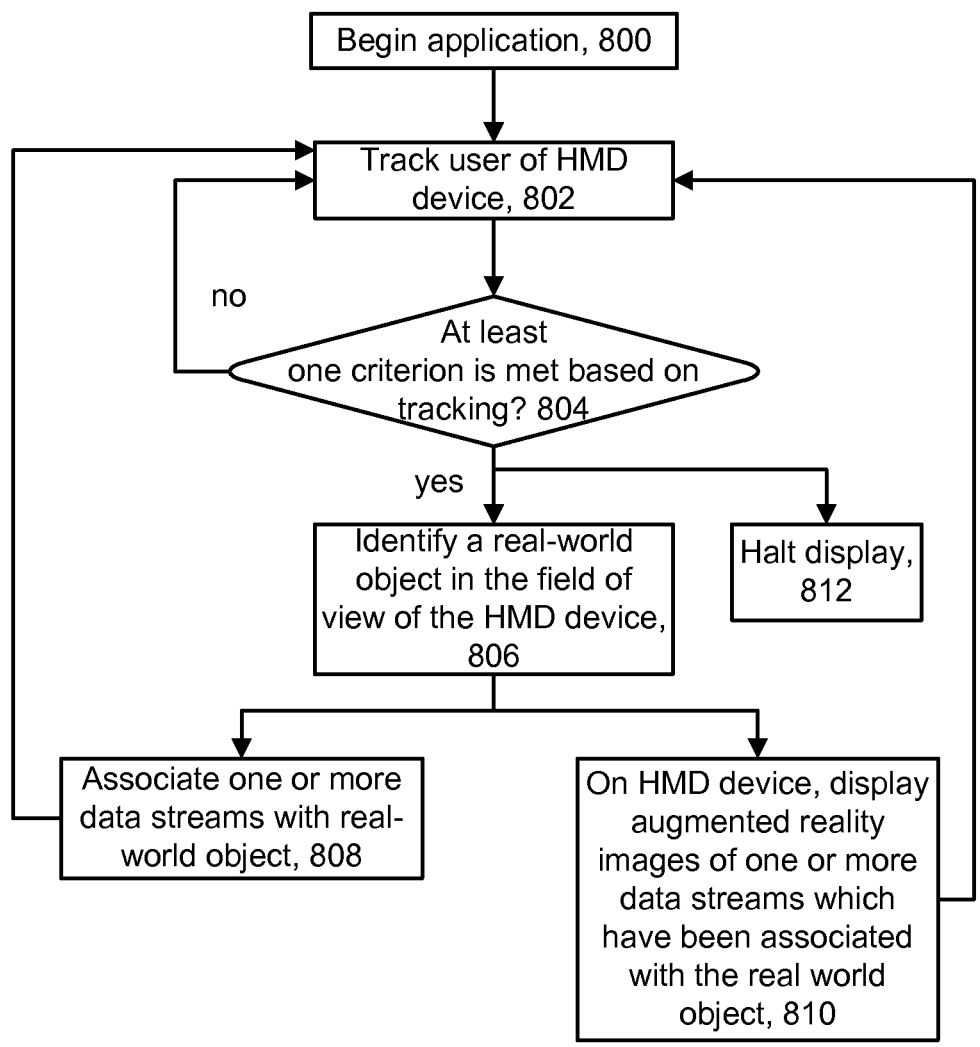
FIG. 8 is a flow chart describing one embodiment of a process for associating a data stream with a real-world object, and for displaying augmented reality images registered to the real-world object using the HMD device of FIG. 1.

FIG. 8 is a flow chart describing one embodiment of a process for associating a data stream with a real-world object, and for displaying augmented reality images registered to the real-world object using the HMD device of FIG. 1. At step 800, an application of the HMD device begins. Step 802 includes tracking a user of the HMD device, such as a location and gaze direction of the user, as discussed further in connection with FIGS. 9A-9C. Decision step 804 determines if at least one criterion is met based on the tracking, as discussed further in connection with FIG. 10. If decision step 804 is false, the control flow returns to step 802. If decision step 804 is true, the control flow moves to step 806 or 812. Step 806 identifies a real-world object in the field of view of the HMD device, as discussed further in connection with FIG. 11. At this point, either of two steps can follow. Step 808 associates one or more data streams with the real-world object, as discussed further in connection with FIG. 12, in a configuration process. At step 810, the HMD device displays augmented reality images of one or more data streams which have been associated with the real-world object, as discussed further in connection with FIG. 13A.

Step 812 halts a display of augmented reality images, such as when a biological metric indicates that the user is in an excited state and therefore likely has other, more pressing concerns and should not be distracted by the augmented reality images. The process can be restarted when the biological metric indicates that the user is no longer in the excited state.

Generally, the process involves determining when the user is in the presence of an object that the user wishes to designate as a registered object, to associate the object with a data stream, or when the user is in the presence of a previously-registered object, in which case an augmented reality image is displayed in a location of the object, or otherwise in a position which is registered to a position of the object. In one approach, energy consumption and false identification of registered objects can be reduced by having the HMD device scan an area when such scanning is commanded by the user or is likely to identify a registered object, but not at other times.

FIG. 9A depicts further details of step 802 of FIG. 8 for tracking a user of an HMD device. A user can be tracked in different ways. At step 900, the tracking of the location of the user can involve one or more sources of location information, including GPS, cell signal information, location-aware network information and aggregated depth mapping as discussed previously in connection with FIG. 3. The HMD device could also detect wireless transmissions from an object, such as from an RFID tag or by near field communications. The HMD device can periodically attempt to read any RFID tags which are in the vicinity by transmitting an interrogation signal. The RFID tag of an object can respond by transmitting an identifier. The HMD device can then conclude that it is at a location of the object. Note that this location data provides location relative to an object, rather than an absolute geographic location, as provided by GPS, for instance. However, either type of location data is useful. With near field communications (NFC), typically used for making payments by smart phone, an embedded NFC chip on the object sends a short distance message which can be received by the HMD device, to allow the HMD device to conclude that it is at a location of the object.

Step 902 can include detecting a user gesture such as a hand gesture, or detecting some other form of user command, such as a voice command received via microphone 110 in FIG. 3. A manual user command entered via a physical interface could be used as well. The physical interface could include, e.g., one or more control buttons on the HMD device, or on a computing device in communication with the HMD device. For instance, such as computing device could be a cell phone or a laptop computer running an application for controlling the HMD device. Step 904 includes tracking one or both eyes of a user using technology described above, and as discussed further in connection with FIG. 9B. Step 906 includes tracking a head orientation of the user using technology described above, and as discussed further in connection with FIG. 9C.

Step 908 for tracking a biological metric of the user can include detecting a body characteristic such as heart rate, pupil dilation, body temperature and blood glucose level using appropriate sensors. For example, as mentioned, the ear lobe clip 7 of the HMD device of FIG. 1 can be used to continuously or intermittently monitor the user's heart rate.

Pupil dilation can be determined using the eye tracking camera 134B of FIG. 3, which continuously obtains an image of the eye and pupil. The amount of pupil dilation can be determined based on the pupil diameter, for instance. Body temperature can be measured in one approach, by a temperature sensor which contacts the user's skin.

Step 908 for tracking a biological metric can also include determining a vocalization characteristic of the user such as pitch and rate of speech. The user's voice, while speaking aloud or singing, for instance, can be captured by the microphone 110 (FIG. 1) and processed in the analog and/or frequency domain to determine the characteristic. A rate of speech can be determined in various ways. For example, U.S. Pat. No. 6,629,072, "Method of an arrangement for speech recognition with speech velocity adaptation," incorporated herein by reference, measures a speech velocity based on the number of spoken and recognized words per time unit, or the number of recognized phonemes in a predefined time interval.

Generally, any type of biological metric, or combination of metrics, can be used to determine a physical and/or mental state of the user, and to start, stop and/or adjust the augmented reality images, including the presentation of text, accordingly. For example, the biological metric may indicate that the user is in an excited state, based on a heart rate or pupil dilation being above a threshold. In response, the HMD device could stop the display of augmented reality images. The display could be resumed when the biological metric indicate that the user is no longer in an excited state.

FIG. 9B depicts further details of step 904 of FIG. 9A for tracking a user's eyes. In step 910, the eye is illuminated, e.g., using infrared light from several LEDs of the eye tracking illumination 134A in FIG. 3. In step 912, a reflection from the eye is detected using one or more infrared eye tracking cameras 134B. In step 914, the reflection data is provided to the processing unit 4. In step 916, the processing unit 4 determines the position of the eye based on the reflection data, as discussed above. Step 918 determines a gaze direction and a focal distance (e.g., discussed further in connection with FIG. 14). Thus, it can be determined when a user is looking at a particular real-world object based on the gaze direction, and optionally, the focal distance.

The location of the eyeball can be determined based on the positions of the cameras and LEDs. The center of the pupil can be found using image processing, and ray which extends through the center of the pupil can be determined as a visual axis. In particular, one possible eye tracking technique uses the location of the glint, which is a small amount of light that reflects off the pupil. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

The gaze direction determined by the eye tracking camera can determine the direction in which the user is looking, either alone or in combination with the head orientation.

FIG. 9C depicts further details of step 906 of FIG. 9A for tracking a head orientation of a user. At step 920, the processing unit 4 accesses data from three axis gyro 132B. In step 922, the processing unit 4 accesses data from three axis accelerometer 132C. In step 924, the processing unit 4 accesses data from three axis magnetometer 132A. Based on these inputs, the processing unit 4 can determine a head orientation, at step 926. In another approach, the processing unit 4 refines orientation data which is received from the hub computing device 12 with the data from the gyro, accelerometer and magnetometer of the HMD device. As mentioned, the gyro, accelerometer and magnetometer are examples of inertial sensors. The at least one control circuit can access at least one of the inertial sensors to determine an orientation of the user's head and to determine that at least one criterion is met based on whether the orientation of the user's head indicates that the user is looking in a direction of the real-world object. The head orientation can determine the direction in which the user is looking, either alone or in combination with the gaze direction.

FIG. 10 depicts further details of decision step 804 of FIG. 8 for determining if at least one criterion is met based on tracking of a user. Various criterion can be considered. For example, one or more criterion can be provided for the steps 900, 902, 904, 906 and 908 of FIG. 9A.

At step 1000, a location criterion can be met when location data corresponds to a predetermined location. The location criterion can be expressed in the same form as the location data, and can include threshold levels which allow for some range of location data to be interpreted as a same location. For example, if the location data is expressed in longitude and latitude coordinates, the location criterion can be some range of longitude and latitude coordinates. If the location data is expressed in terms of whether or not the HMD device is in the location of a WLAN, the location criterion can indicate that the HMD device is in the location of the WLAN if the HMD device is close enough to sense the WLAN and its identifier. Or, the location criterion can require the HMD device to sense the WLAN with a minimum signal strength before declaring that the HMD device is in the location of the WLAN. The location criteria can also require that the HMD device is in a particular location for a minimum amount of time, such as a few seconds, before declaring that the location criterion is met.

Regarding step 1002, a user gesture or other command criterion can be met when the users makes a recognized gesture, or provides another recognized command such as a voice command.

Regarding step 1004, a gaze direction criterion can be met when the user looks in a direction of an object. For example, the user may look in the direction of an unregistered object for a threshold amount of time, in response to which the HMD device determines that the user is interested in registering the object to a data stream, and initiates a process for doing so (see, e.g., FIGS. 16A-16I). Or, the user may look in the direction of a registered object for a threshold amount of time, in response to which the HMD device displays an augmented reality image based on the associated data stream (see, e.g., FIGS. 16G, 17A and 17B). This criterion can determine if the gaze direction is within a range of gaze directions which include a particular object.

Regarding step 1006, a head orientation criterion can be met when the user's head assumes a specified orientation. The user may be assumed to be looking in a straight ahead direction of the head.

Step 1008 determines if a biological metric criterion is met. For example, a user can be considered to be in an excited state when his or her heartbeat exceeds a threshold level, optionally, for at least a threshold amount of time.

FIG. 11 depicts further details of decision step 806 of FIG. 8 for identifying a real-world object in a field of view of an HMD device. Step 1100 identifies a start of the process for tracking a field of view of an HMD device. Step 1102 includes receiving one or more depth images from one or more forward-facing depth cameras of the HMD device, as discussed above. Step 1104 includes determining a visual characteristic (such as color, pattern, brightness, reflectivity, perimeter/boundary shape, size or aspect ratio) of a real-world object in the field of view of the one or more forward-facing depth cameras.

FIG. 12 depicts further details of step 808 of FIG. 8 for associating one or more data streams with a real-world object. Step 1200 includes displaying augmented reality images from candidate data streams. In one approach, previous digital content consumption habits of the user, such as a history of web browsing, use of cell phone applications, television viewing, or use of applications on a gaming console such as the hub computing system, can be used to suggest candidate data streams that the user might be interested in. Demographic information of the user such as age, gender, geographic location, hobbies, employment, income and so forth could also be used. In another approach, the candidate data streams are identified from search criteria specified by the user, such as by a voice command, e.g., "search local news channels," or "search baseball scores." In another approach, the candidate data streams are based on the content of data streams which are associated with other registered objects of the user. In another option, the candidate data streams can include one or more data streams which friends of the user have agreed to share. See also FIG. 16E, which provides an example of displaying augmented reality images from candidate data streams. One or more of the augmented reality images can be displayed in a location in the user's field of view which is registered to the object, or in a location which is not registered to the object, in this configuration stage.

Step 1202 includes receiving a user command which selects one or more of the candidate data streams. In an approach where multiple augmented reality images from candidate data streams are displayed concurrently, such as in FIG. 16E, the user can make a hand gesture to point at one of the augmented reality images, for instance, to provide a command to select the associated data stream. The command can be confirmed by the HMD device providing a visual feedback such as a perimeter highlight which visually distinguishes the selected augmented reality images from unselected augmented reality images, such as in FIG. 16F. Or, the user can use a voice command such as "select weather" and "select stock ticker" to select the associated data streams. One or more data streams can be associated with one object. Or, the augmented reality images can be highlighted in a sequence, one at a time, by the HMD device, in which case the user provides the voice command "select" or "yes" to select a currently highlighted augmented reality image. Other variations are possible. The user can also provide a command which indicates whether the selected data streams are to be associated with the particular object, or with a class of objects, where the particular object is one instance of the class (see FIG. 16F). In the example of a picture frame, the class could be any picture frame which the users sees while moving around in his home or office.

Step 1204 includes providing one or more records which associate the one or more selected data streams with the object or class of object. See also FIG. 13B. For example, at least one record can be stored for the real-world object, where the at least one record associates at least one visual characteristic of the real-world object, based on the image data, and the location. For example, when the object is a framed picture, a record can associated a visual characteristic such as an aspect ratio (e.g., width to height ratio) of the picture with a location such as GPS coordinates of user's home or of a particular room in the home. The record could also associate a gaze direction of the user with the location. The gaze direction can be expressed as a vector in a world coordinate system, for instance, by obtaining the gaze direction in a local coordinate system of the HMD device. A translation of the gaze direction to the real-world coordinate system could be made if desired. See FIGS. 14, 15A and 15 for examples of a gaze direction. The record also identifies the one or more selected data streams such as by a URL or other web address, file name, or other data source identifier. The record can be stored, e.g., at the HMD device or at a computing device or memory location in communication with the HMD device, either local to the HMD device, such as on the user's person, in the same room or building, or remotely, such as in a network cloud. The record can subsequently be compared to a current location and/or gaze direction to determine if the user is in a location of the object and looking in a direction of the object, in response to which the corresponding data source is accessed and displayed.

FIG. 13A depicts further details of step 810 of FIG. 8 for displaying, on an HMD device, one or more data streams associated with a real-world object. Step 1300 includes accessing records for different objects, such as discussed in connection with FIGS. 12 and 13B. Step 1302 includes determining a record with visual characteristics which match the detected visual characteristics of the object, as a matching record. In one approach, a degree of similarity can be determined between one or more visual characteristics of the object and one or more corresponding visual characteristics of each record, and the record with the highest similarity can be considered a match. The similarity may be required to exceed a threshold measure as well in order for a match to be declared. Different visual characteristics can be assigned equal or unequal weights in determining the similarity so that visual characteristics which are considered to be more reliable are assigned greater weights. Step 1302 can filter out the records for which the location data is inconsistent with the current location of the user, to avoid unnecessary comparisons.

Step 1304 includes displaying the augmented reality images of the matched record, registered to the object, such as described in connection with FIGS. 16H and 16I, so that the augmented reality images are fixed to a location of the object. Note that the object can be static or moving relative to the user. The user can move relative to the object, such as when the object is a picture or billboard and the user walks or drives by the picture or billboard. Or, the object can move relative to the user, such as when the object is the side of a truck. Step 1306 includes adjusting an appearance of the augmented reality images based on a visual characteristic of the object (e.g., as determined in step 1104 of FIG. 11).

As mentioned, the forward-facing camera of the HMD can determine visual characteristics such as color, pattern, brightness, size, shape, aspect ratio and/or reflectivity of the object. The HMD device, in response, can adjust the appearance of the augmented reality images, e.g., to achieve better visibility of the images. For example, the size, color, or font of the images can be adjusted. A light intensity of the augmented reality image could also be adjusted. If the object is a dark color (e.g., black), the images can use a light color (e.g., white) to provide contrast. Further, if the object had a busy pattern, such as might be found in a painting or photo, it might be helpful for the images to use a larger, blockier and/or wider font to improve visibility of the text.

FIG. 13B depicts an example record associated with an object. The record 1310 includes an object and/or object class identifier 1312, one or more visual characteristics 1314, one or more types of location data 1316, privacy settings 1318 and one or more data streams 1320 which are associated with the object or object class. The HMD device can include one or more of such records, e.g., one record for each registered object of the HMD device.

Figure 14:
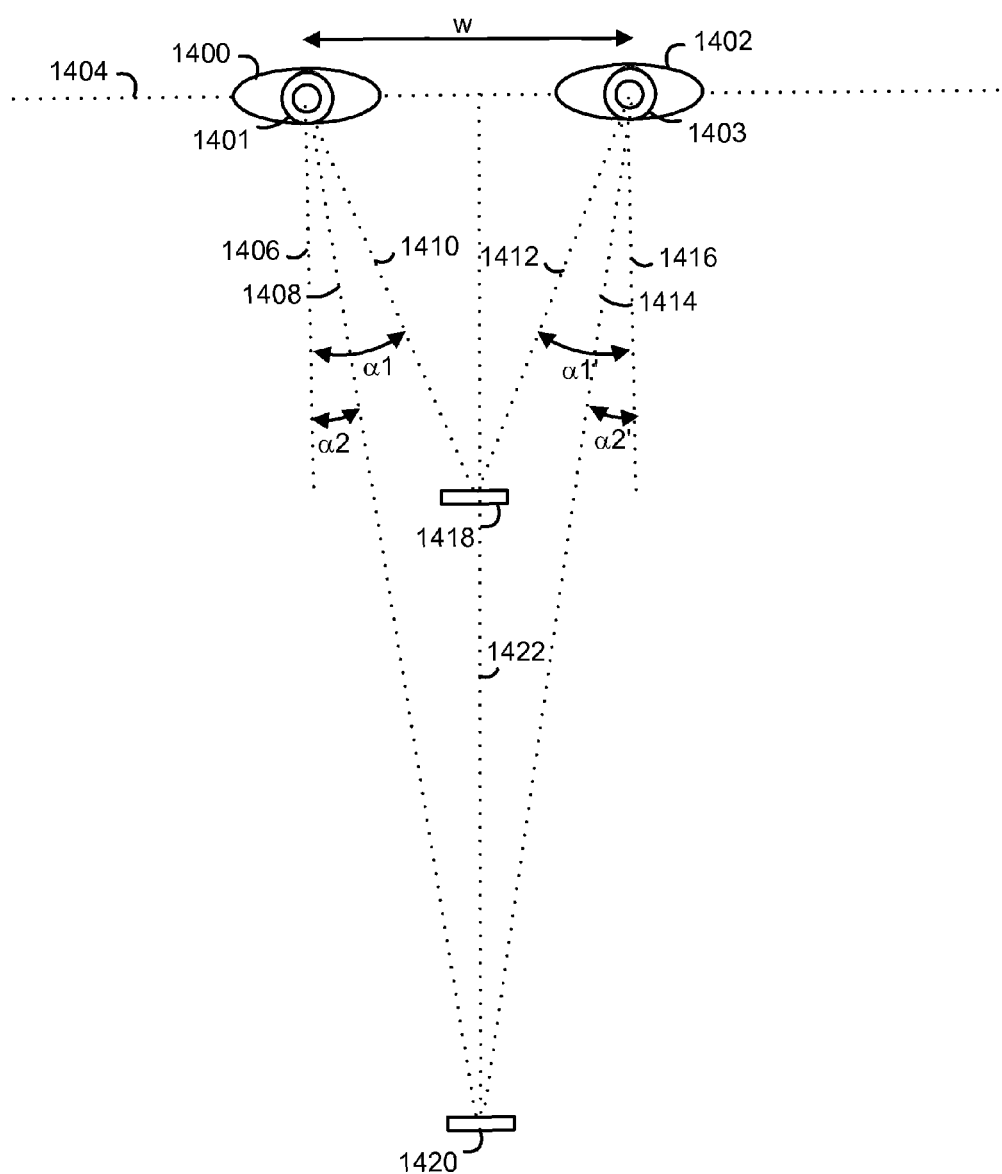
FIG. 14 depicts a calculation of a focal distance as discussed in step 918 of FIG. 9B.

FIG. 14 depicts a calculation of a focal distance as discussed in step 918 of FIG. 9B. Generally, a focal distance, or focal length, is a distance between a lens, such as the eye, and its focal point. The focal distance can also be considered as a distance between the HMD device and the focal point, due to the relative closeness of the eye and the HMD device. An axis 1404 extends between the eyes 1400 and 1402 and is orthogonal to a central axis 1422. An axis 1406 extends from the center of the pupil 1401 of the eye 1400, and an axis 1416 extends from the center of the pupil 1403 of the eye 1402. The axes 1404 and 1406 are orthogonal to the axis 1404 and represent a straight ahead direction of the user. When a user gazes at, and focuses on, an object (a real object, or a virtual object which is part of an augmented reality image), a focal distance can be determined which is a distance from the eye to a gaze location of the object. For example, when the user focuses on an object 1418, the eye 1400 has a visual axis 1410 which extends from the pupil 1401 to the object 1418 an angle $\alpha 1$ from the axis 1406, and the eye 1402 has a visual axis 1412 which extends from the pupil 1403 to the object 1418 at an angle $\alpha 1'$ from the axis 1416. The angles $\alpha 1$ and $\alpha 1'$ can be the same, such as when the object 1418 is centered between the user's eyes, or different, when the object 1418 is not centered between the user's eyes, but is offset to one side.

The angles of the visual axes vary as a known function of the focal distance, where the angle becomes smaller as the focal distance becomes larger, so that the focal distance can be determined from the angles of the visual axes, for one or both eyes. The eye tracking components can be used to determine the angles of the visual axes. For example, consider an object 1420, which is further at a greater focal distance than the object 1418. In this case, when the user focuses on the object 1420, the eye 1400 has a visual axis 1408 which extends from the pupil 1401 to the object 1420 an angle $\alpha 2 < \alpha 1$ from the axis 1406, and the eye 1402 has a visual axis 1414 which extends from the pupil 1403 to the object 1420 at an angle $\alpha 2'$ from the axis 1416. The angles $\alpha 2$ and $\alpha 2'$ can be the same, such as when the object 1420 is centered between the user's eyes, or different, when the object 1420 is not centered between the user's eyes, but is offset to one side.

Figure 15A:
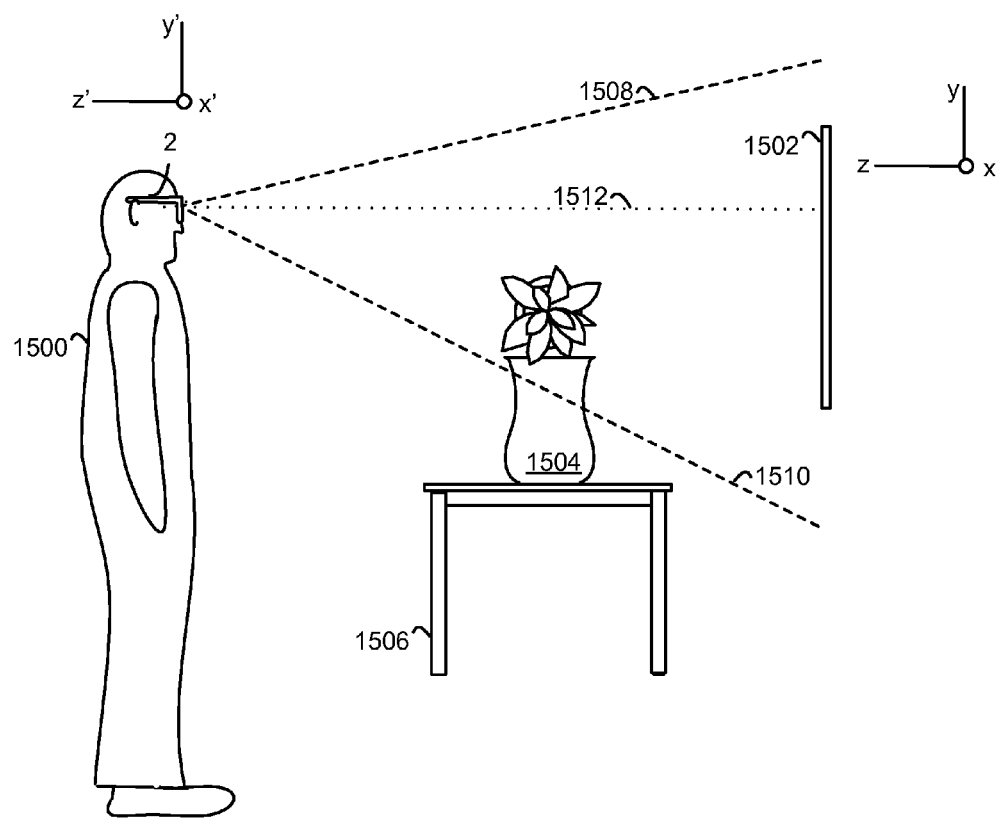
FIG. 15A depicts a field of view of a scene including an object 1502, from a side view.

FIG. 15A depicts a field of view of a scene including an object 1502, from a side view. In this scene, the user 1500 wearing the HMD device 2 looks in a gaze direction 1512 toward an object 1502, such as a wall-hanging picture. Other objects in the scene include a flowerpot 1504 on a table 1506. Lines 1508 and 1510 are upper and lower boundaries, respectively, of a field of view of the at least one forward-facing camera of the HMD device. A local coordinate system of the HMD device is represented by Cartesian coordinates x', y', z', and a world coordinate system is represented by Cartesian coordinates x, y, z. The directions x and x' come out of the page.

The gaze direction can be determined for one or both eyes of a user. The gaze direction is a direction in which the user looks and is based on a visual axis, which is an imaginary line drawn, e.g., through the center of the pupil to the center of the fovea (within the macula, at the center of the retina). At any given time, a point of the object that the user is looking at is a fixation point, which is at the intersection of the visual axis 1512 and the object 1502, at a focal distance from the HMD device. When both eyes are tracked, the orbital muscles keep the visual axis of both eyes aligned on the center of the fixation point. The visual axis can be determined, relative to a coordinate system of the HMD device, by the eye tracker. The augmented reality image can also be defined relative to the coordinate system of the HMD device so that it is not necessary to translate the gaze direction from the coordinate system of the HMD device to another coordinate system, such as a world coordinate system. An example of a world coordinate system is a fixed coordinate system of a room in which the user is located. Such a translation would typically require knowledge of the orientation of the user's head, and introduces additional uncertainties.

Figure 15B:
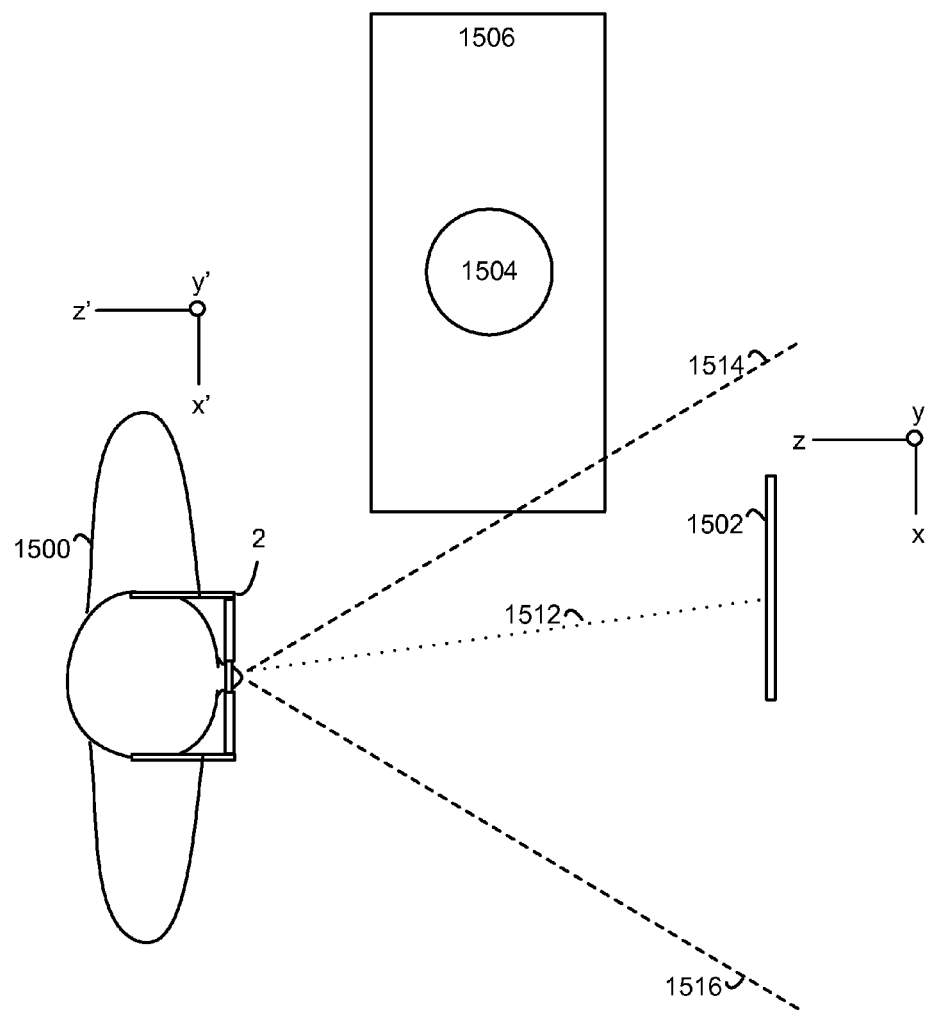
FIG. 15B depicts the field of view of the scene of FIG. 15A, from an overhead view.

FIG. 15B depicts the field of view of the scene of FIG. 15A, from an overhead view. Lines 1514 and 1516 are left and right hand boundaries, respectively, of the field of view of the HMD device. The gaze direction can indicate whether a user is looking at an object directly or only peripherally. If the object is in a central zone of the user's field of view, it can be concluded that the user is directly looking at the object. If the object is in a peripheral zone of the user's field of view, it can be concluded that the user is looking peripherally at the object. The central zone could be defined by a range of horizontal and vertical angles, for instance, in the field of view. Moreover, an object which is looked at directly can be treated differently than an object which is looked at peripherally. In one approach, an unregistered object which is looked at directly can be identified to undergo the configuration process for being associated with an augmented reality image, while an object which is looked at peripherally is not identified to undergo this process. Similarly, a registered object which is looked at directly can be identified to display the associated augmented reality image, while an object which is looked at peripherally is not identified to cause such a display.

Figure 16A:
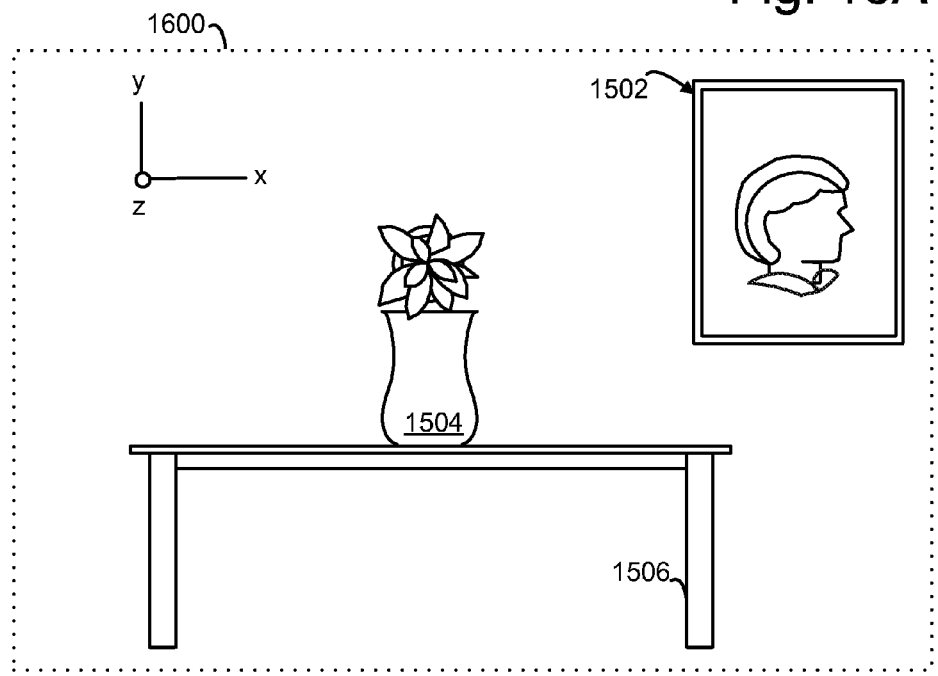
FIG. 16A depicts the scene of FIG. 15A from the user's perspective.

FIG. 16A depicts the scene of FIG. 15A from the user's perspective. In this scene 1600, the object 1502 is a picture or photo or a person's head. Generally, the object which is associated with a data stream can be 2d or 3d, and the augmented reality image can be adjusted based on the 2d or 3d shape.

Figure 16B:
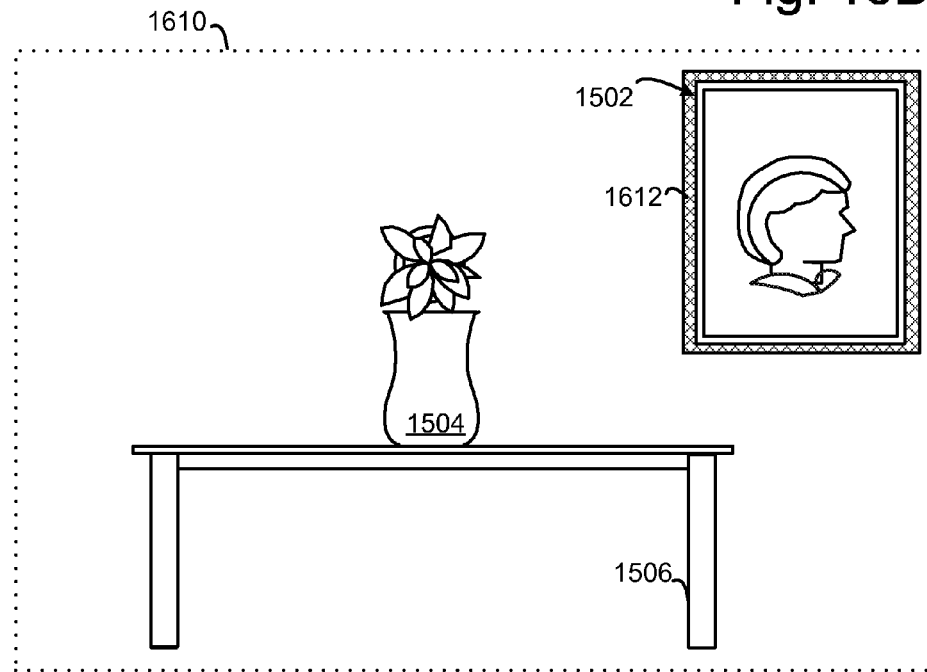
FIG. 16B depicts the scene of FIG. 16A in which the object 1502 has a perimeter highlight using an augmented reality image.

FIG. 16B depicts the scene of FIG. 16A in which the object 1502 has a perimeter highlight using an augmented reality image. In this scene 1610, the object has been identified by the user as an object which is to be associated with a data stream, e.g., based on the user gazing at the object for a period of time, making a gesture such as pointing at the object and/or providing a verbal command. An augmented reality image is a perimeter highlight 1612 at a perimeter of the object 1502 as a visual feedback to the user that the HMD device has recognized the object. An audio feedback such as a tone could also be provided. Based on a user command, or automatically, with no user input, a next step can be made to associate one or more data streams with the object. For example, upon seeing the perimeter highlight, the user could make a verbal command such as "next step" or "select data stream" to proceed. The recognition of the object could be in response to a user command such as "recognize object." Or, the user could make a gesture which such as pointing at the object. If the object is inadvertently recognized, the user can enter a command such as "stop."

FIG. 16C depicts diagrammatically how the HMD device 2 provides the augmented reality image as the perimeter highlight 1612 of the object 1502 of FIG. 16B. A region 1619 diagrammatically indicates a portion of the lens 121 which provides the augmented reality image 1612. Similarly, a region 1622 diagrammatically indicates a portion of the lens 118 which provides the augmented reality image 1612.

Figure 16D:
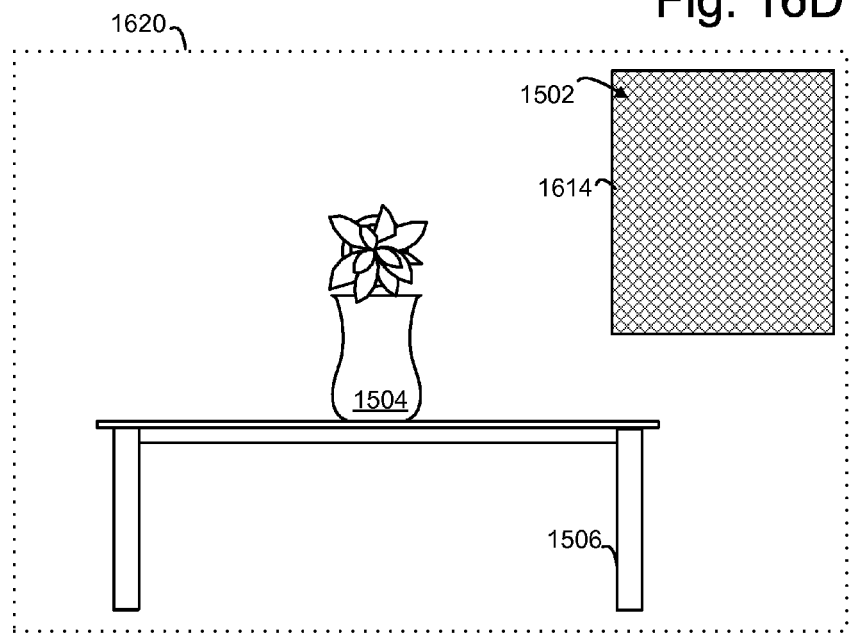
FIG. 16D depicts the scene of FIG. 16A in which the object 1502 has an area highlight using an augmented reality image.

FIG. 16D depicts the scene of FIG. 16A in which the object 1502 has an area highlight using an augmented reality image. In this scene 1620, the area highlight 1614 is an example alternative to the perimeter highlight 1612 of FIG. 16B. Generally, various types of visual feedback can be provided to the user to indicate that the HMD device has recognized an object. Another example is a partially transparent augmented reality image which allows the object to be seen underneath. Another example is a flashing augmented reality image.

Figure 16E:
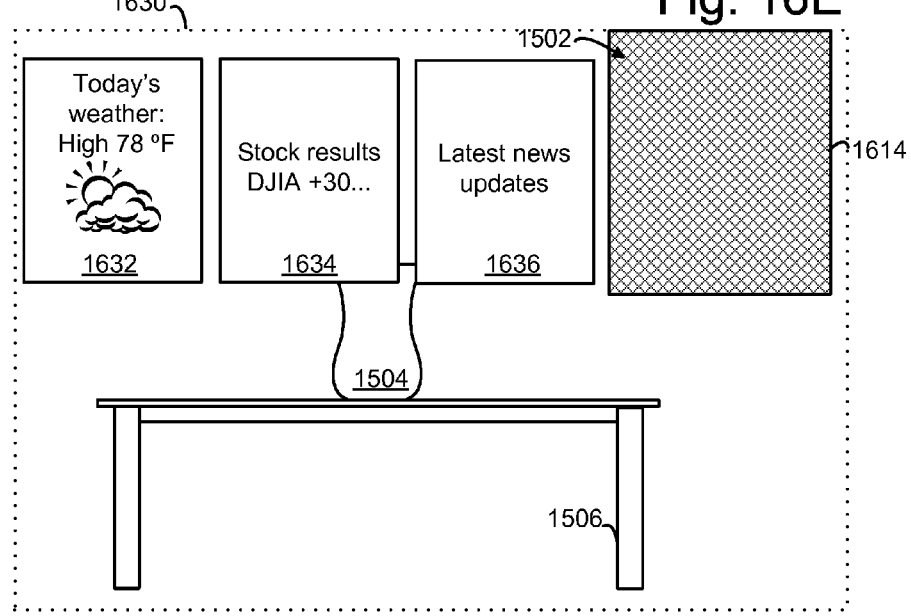
FIG. 16E depicts augmented reality images of different data streams from which the user can select to be associated with the object 1502 of FIG. 16B.

FIG. 16E depicts augmented reality images of different data streams from which the user can select to be associated with the object 1502 of FIG. 16B. In this scene 1630, augmented reality images 1632, 1634 and 1636 are provided to represent data streams for weather information, stock information and news information, respectively. The augmented reality images 1632, 1634 and 1636 are not yet registered to the object in this example, and the highlighting of the object continues with the area highlight 1614. In this case, a set of initial candidate data streams are provided for the user to choose from. The user could select one or more of these candidates or enter a command to have different candidates displayed. One possible command involves a gesture in which the user points at one of the augmented reality images 1632, 1634 and 1636 and drags or "throws" it to a location over the object 1502 or area highlight 1614.

FIG. 16F depicts the scene of FIG. 16E in which the augmented reality images 1632 and 1634 are selected by the user. In the scene 1640, the user selects two of the three initial candidates, namely the augmented reality images 1632 and 1634, using a voice command or gesture, for instance. A visual feedback of the selection is provided by perimeter highlights 1645 and 1647. An audio feedback such as a tone could also be provided. In response to the selections, additional augmented reality images 1641 and 1643 can be displayed which ask the user whether the selections are to apply to the object only or to the object class, respectively. The user can select one of the images 1641 and 1643 to provide the desired response. Optionally, the user can be asked by audio whether the selections are to apply to the object only or to the object class, and can response by a spoken command. In another approach, the selections apply to the object only or to the object class according to a default setting, and the user need not provide an additional command. A class of objects can be defined as objects which have similar visual characteristics as the object 1502, based on a specified degree of similarity. The degree of similarity can be as discussed in connection with step 1302 of FIG. 13A, for instance.

FIG. 16G depicts the scene of FIG. 16B in which the object 1502 is replaced by augmented reality images from one or more data streams. In the scene 1650, an augmented reality image 1646 is displayed at a location of the object 1502, which is no longer visible. The augmented reality image is considered to be registered to the object because the position of the augmented reality image in the field of view of the HMD device is based on the position of the object. Note that the augmented reality image need not overlap the object. Instead, the augmented reality image could be at another position relative to the object such as above, or to the left, of the object.

Optionally, the augmented reality image can be partially transparent so that the object is still visible to the user. In another approach, the augmented reality image is only displayed over a portion of the object. Note that the one or more selected data streams can be formatted to be suitable for the size of the object. Also, when multiple data streams are selected, the data can be displayed together. For example, regions 1642 and 1644 of the augmented reality image 1646 provide a display based on the weather information and the stock information, respectively. In another approach, when multiple data streams are selected, the data streams can be displayed in a repeating sequence, one data stream at a time. Other variations are possible. Further, the data streams can include audio data which is played for the user, e.g., via the earphones 130 of FIG. 2, when the corresponding images are displayed. Another option is to accentuate the initial displaying of the augmented reality image such as by flashing the image to get the user's attention. After a period of time, the flashing can stop.

Another option is to provide a transition state such as a gradual fade in or out of the augmented reality image. The image fades in when the user looks at the object, and fades out when the user looks away from the object. A condition may be imposed to prevent the image from appearing and disappearing too quickly to avoid distracting the user.

Once the user selects the one or more data streams, they are associated with the object and are displayed in an operational mode, when the user is near the object and looking in a direction of the object, or the object at least is in the field of view of the HMD device. Moreover, the user can change the data stream selection at a later time. For example, while augmented reality images from a first data stream is displayed, the user can enter a command to "change data stream," in response to which the user can identify/select a second data stream, so that augmented reality images from the second data stream, instead of the first data stream, are displayed.

In another option, the selected data stream is replaced by a data stream which provides a session of one or more other users in an application, such as a multi-player game. For example, this can allow the user to learn that his friends are currently playing the game, and provide a command to join in the session. The command causes the HMD device to communicate with one or more other computing devices of the one or more other users to allow the user to join the session of the application. Generally, session meta data of a data stream can be provided to allow a user to join, share or learn more about the data stream. For example, when a data stream of a multiplayer game is current displayed on an object, the user can provide a command to join the session of the game to a different computing device such as a gaming console/hub. The user can provide a gesture in which the user appears to simply touch the data feed to join it.

In another approach, the user provides a command which sets a privacy setting of the user for the data stream. The privacy setting can indicate whether the at least one record which associates the data stream with the real-world object can be shared with one or more other users, such as described in connection with FIG. 16E.

In another approach, the user can modify the appearance of the augmented reality image, such as by providing a command to make the image larger. An example command is a "pull to expand" gesture using the hands. The user could also provide a command such as "keep image" to continue to view the augmented reality image even after looking away from the object, when the object is no longer in the field of view of the HMD device. In this case, the augmented reality image continues to be visible but is not registered to the location of the object. The augmented reality image can be made visible in a predetermined portion of the field of view, such as straight ahead, to the lower right, and so forth. Conversely, the user can provide a command to select a currently-viewed augmented reality image and data stream which are not currently associated with an object, to be associated with the object.

FIG. 16H depicts diagrammatically how the HMD device provides the augmented reality image of FIG. 16G, while the user's head has one orientation, so that the augmented reality images are registered to the object 1502. The object 1502 has a first position and orientation with respect to the fixed, world coordinate system, which is independent of the local coordinate system of the HMD device 2. In this first relative position and orientation of the object with respect to the HMD device, a region 1619 diagrammatically indicates a portion of the lens 121 which provides the augmented reality image 1646. Similarly, a region 1622 diagrammatically indicates a portion of the lens 118 which provides the augmented reality image 1646. In this scenario, the world (x,y,z) coordinate system is not rotated relative to the local (x',y',z') coordinate system, but is translated away from the local coordinate system.

FIG. 16I depicts diagrammatically how the HMD device provides the augmented reality image of FIG. 16G, while the user's head has another orientation, so that the augmented reality images continue to be registered to the object 1502. The augmented reality image 1646 has the same position and orientation with respect to the world coordinate system as in FIG. 16H, even though the local coordinate system is rotated relative to the world coordinate system due to movement/rotation of the HMD device 2, which in turn is due to movement/rotation of the user's head. This movement can be detected as a change in an orientation of the user's head using sensors on the HMD, as discussed. To ensure that the augmented reality image is rendered in substantially the same real-world location, e.g., registered to the real-world object, the pixels of the HMD device which provide the augmented reality image are modified. For example, a region 1621 diagrammatically indicates a portion of the lens 121 which provides the augmented reality image 1646, and a region 1623 diagrammatically indicates a portion of the lens 118 which provides the augmented reality image 1646.

Figure 17A:
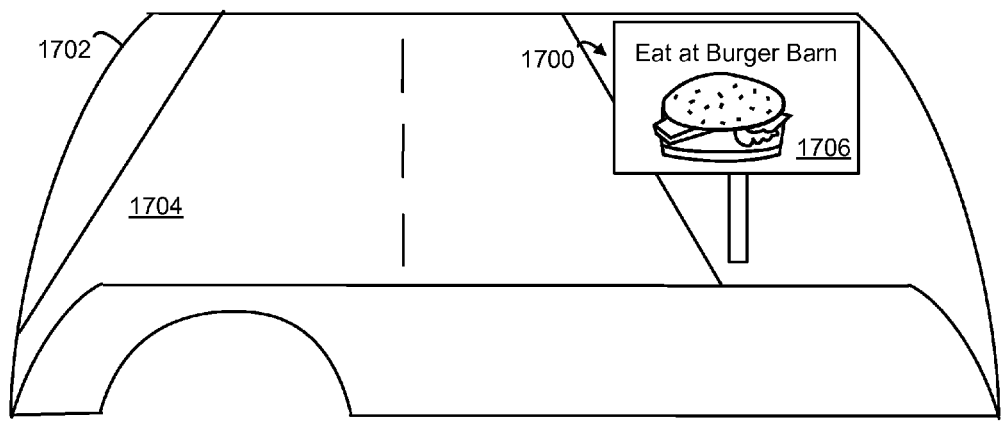
FIG. 17A depicts a scenario in which an advertisement is provided as an augmented reality image associated with a billboard.

FIG. 17A depicts a scenario in which an advertisement is provided as an augmented reality image associated with a billboard. A billboard 1700 is an example object on which an augmented reality image 1706 is displayed. The billboard is on the side of a road 1704 and seen from the windshield 1702 of a car in which the HMD device-wearing user is carried. The fact that the user is in the proximity of a particular billboard, such as while walking, bicycling or driving, can be determined based on the known, fixed location of the billboard and the detected, current location of the user. It can also be assumed that user can see a certain distance ahead, such as 200 feet. Further, the fact that the user is approaching the billboard can also be determined by tracking movement of the user relative to the billboard. The fact that the user is gazing at the billboard could also be determined by recognizing the billboard in the field of view of the HMD device. For example, the billboard could have an aspect ratio that is within a range of aspect ratios that are associated with a particular billboard, or with billboards generally as a class of objects.

In response to determining that the user is near, and looking at, the billboard, an augmented reality image can be displayed which is customized to the user. For example, previous content consumption and/or demographics of the user may indicate that the user may be interested in fast food restaurants, as a result of which the augmented reality image 1706 provides an advertisement for a hamburger restaurant. Generally, a plurality of available data streams can be associated with the real-world object 1700, and one or more data streams can be identified from among the plurality of available data streams based on an identifier of the user.

The user can set a priority setting, where the priority setting indicates a priority of a personal data stream which is associated with a real-world object relative to a public data stream which is associated with the real-world object. For example, the user can choose to allow a customized advertisement to be display as a personal data stream in place of a non-customized advertisement, which is a public data stream. In this case, the personal data stream has a higher priority than the public data stream.

In one approach, an augmented reality image is displayed on a billboard which is in a unique geographic location, such as the last billboard on the highway before the user exits to go home. In another approach, an augmented reality image is displayed on a billboard which is in a location matching a class of geographic locations, such as any billboard on the highway which the user sees when driving from home to work, or from work to home. A more open ended definition is that the class of geographic locations is any location of a billboard, or, in particular, any location of an object having similar characteristics as a billboard (e.g., a vertical planar object having an aspect ratio within a specified range of aspect ratios).

Figure 17B:
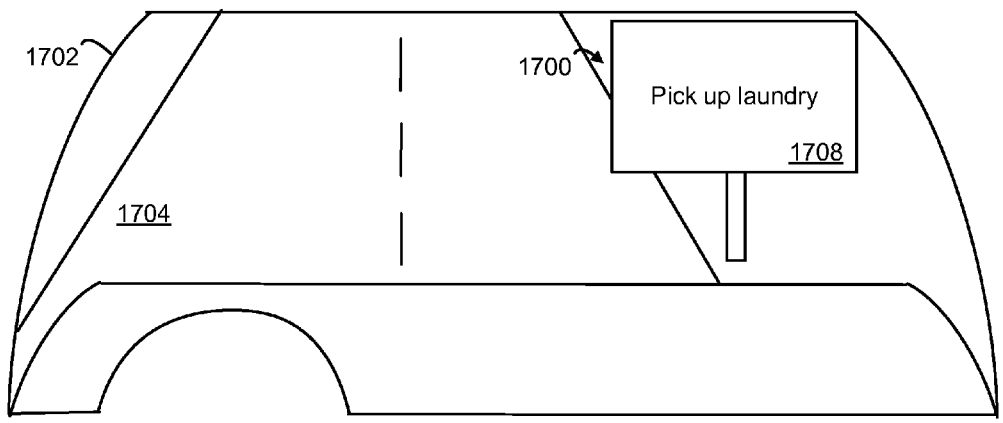
FIG. 17B depicts a scenario in which a personal user message is provided as an augmented reality image associated with a billboard.

FIG. 17B depicts a scenario in which a personal user message is provided as an augmented reality image associated with a billboard. In this example, the augmented reality image 1708 provides a personalized reminder message to the user such as to pick up the laundry when exiting the highway at a certain exit. This can be achieved in different ways. In one approach, when the user is looking at the billboard 1700, the users enter a command which causes the HMD device to recognize the billboard. The HMD device may display candidate data streams such as in FIG. 16E, or wait for a further command. In either case, the user can provide a command such as by speaking "set personal message for tomorrow" and "pick up laundry." The message and the time for displaying the message are thus set.

In another approach, the user sets a reminder to "pick up laundry" on a calendar application which the users maintains on a cell phone or PC. The HMD device accesses the calendar to display the tasks for the current date or time on the billboard. The calendar could also identify the location of the task, e.g., "Super Laundry at 99 Main Street," in which case the HMD device can decide to display the reminder in response to determining that the user is nearing the pickup location, and/or a highway exit which is near the pickup location. The HMD device could also generate driving directions, such as "turn right at exit, go 1 mile."

The windshield 1702 of the car, or a specified portion of the windshield, can also be an object on which augmented reality images are displayed.

Accordingly, it can be seen that the HMD devices provides many advantages. HMD device scans the user's surroundings for specific objects, or for general classes of objects and shapes. It can scan using a combination of sensors (e.g., RGB and depth cameras) and further understands which objects should be around by sifting through a location log, where, primarily, GPS, network ID, and aggregated depth mapping can be used to determine the user's location in order to compare that against the last known location of certain objects. The list of objects which should be around the user is used to increase the speed and accuracy of object recognition. Once an object is identified, a check is made (locally and/or in the cloud) to see what data stream is associated with that object and the status of any trigger conditions. If a stream is available and if any necessary trigger conditions are met, the HMD looks up the final display parameters (e.g., size, style, bit depth, etc.), creates a stable scene, and renders the digital data. No explicit user command is necessary to turn the display on; by default, as long as the object is in view, the digital data will render to it. The user does have control to adjust when images are rendered, both in the moment (e.g. by turning down or off the HMD device) and as a default condition (e.g., by only showing an image when there is a feed available, or when a trigger condition is met).

In a failure state, such as when an Internet feed is no longer available, the HMD device can either stop rendering to the object, or will display an error state graphic.

When an object is in a rendered state, the user has various methods to control the display. Typical methods include: direct manipulation of virtual points via finger tracking (e.g. "pulling tabs"), voice ("expand the portal to Grandma's house"), gesture (a "wave" over the object turns the feed on or off"), control via PC or mobile device (e.g. a link on a web page can turn portals on or off), gaze detection (looking at the object fades the scene into view, looking away returns the object to normal), multiuser interaction (Bob sends a feed to a nearby object that Mary can see), and implicit user state (Bob's heart rate is too high, so portals are muted or changed to an emergency setting).

Users can ascribe privacy settings to objects, both in the priority of what they see ("personal streams override public streams attached to this object"), and of what they allow others to see ("share this stream with family, or friends, or everyone" etc.)

Advantages of the system include speed, ease of use, and a method for placing "always on" digital information into acceptable and advantageous real-world locations. The user does not have to provide manual commands to a computing device to constantly change from one experience/application to another. Instead, the HMD device allows the user to experience the same result as if the user had many computing devices on, and the user can "set and forget" the HMD device in a way which allows the user to be is surrounded by information, but in an easy to manage and always available manner. There is no time wasted in accessing a data stream. The user can simply glance at a portal to obtain the benefit of the associated data stream.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A head-mounted display device, comprising:
   a microdisplay;
   a forward-facing camera having a field of view of an environment of a user;
   a location detection device, the location detection device is configured to determine a location of a user; and
   a control circuit associated with the microdisplay, the forward-facing camera and the location detection device, the control circuit is configured to:
     process images from the forward-facing camera to make an identification of a real-world object at the location,
     in response to the identification, control the microdisplay to concurrently project to an eye of the user at a first time:
       an augmented reality image which highlights and overlaps the real-world object and which is registered to the real-world object,
       a first data stream of augmented reality images which do not overlap the real-world object, and
       a second data stream of augmented reality images which do not overlap the real-world object,
     receive a selection of the first data stream and the second data stream from the user, and
     in response to the selection, control the microdisplay to concurrently project to the eye of the user, at a second time after the first time, in place of the augmented reality image which highlights the real-world object, and registered to the real-world object:
       a formatted version of the first data stream of augmented reality images, formatted to a size of the real-world object and comprising fewer lines of text than the first augmented reality image which is displayed at the first time, and
       the second data stream of augmented reality images formatted to the size of the real-world object.

2. The head-mounted display device of claim 1, further comprising:
   an eye tracking camera which tracks a gaze direction of the eye of the user, wherein the control circuit, before the first time, is configured to access the gaze direction and make a determination as to whether the gaze direction is in a direction of the real-world object, and if the determination indicates the gaze direction is in the direction of the real-world object, cause the microdisplay to project the augmented reality image which highlights the real-world object.

3. The head-mounted display device of claim 1, further comprising:
   an inertial sensor, the control circuit is configured to access the inertial sensor to determine an orientation of the user's head and control the microdisplay to project the augmented reality image which highlights the real-world object based on a determination that the orientation of the user's head indicates that the user is looking in a direction of the real-world object.

4. The head-mounted display device of claim 1, wherein:
   the second data stream identifies a session of another user in an application; and
   the control circuit is configured to receive a command from the user, and, in response to the command, transmit a signal from the head-mounted display device to another computing device of the another user to allow the another user to join the session of the application.

5. The head-mounted display device of claim 1, wherein:
   the formatted version of the first data stream of augmented reality images and the second data stream of augmented reality images overlap the real-world object.

6. The head-mounted display device of claim 1, wherein:
   the first augmented reality image and the second augmented reality image are not registered to the real-world object before the selection.

7. The head-mounted display device of claim 1, wherein:
   the formatted version of the first augmented reality image and the second augmented reality image are displayed concurrently in respective regions within a shape of the real-world object.

8. A method for controlling a head-mounted display device, comprising:
   determining a location of user of the head-mounted display device;
   processing image data from a forward-facing camera of the head-mounted display device to make an identification of a real-world object at the location;
   in response to the identification, concurrently projecting to an eye of the user at a first time: (a) an augmented reality image which highlights and overlaps the real-world object and which is registered to the real-world object, (b) a first data stream of augmented reality images which do not overlap the real-world object, and (c) a second data stream of augmented reality images which do not overlap the real-world object;

receiving a selection of the first data stream and the second data stream from the user; and in response to the selection, concurrently projecting to the eye of the user, at a second time after the first time, in place of the augmented reality image which highlights the real-world object, and registered to the real-world object: (d) a formatted version of the first data stream of augmented reality images, formatted to a size of the real-world object and comprising fewer lines of text than the first augmented reality image which is displayed at the first time, and (e) the second data stream of augmented reality images formatted to the size of the real-world object.

9. The method of claim 8, further comprising:

tracking a gaze direction of the eye of the user; and accessing the gaze direction and making a determination as to whether the gaze direction is in a direction of the real-world object, and if the determination indicates the gaze direction is in the direction of the real-world object, projecting the augmented reality image which highlights the real-world object.

10. The method of claim 8, further comprising:

determining an orientation of the user's head; and projecting the augmented reality image which highlights the real-world object based on a determination that the orientation of the user's head indicates that the user is looking in a direction of the real-world object.

11. The method of claim 8, wherein the second data stream identifies a session of another user in an application, the method further comprising:

transmitting a signal from the head-mounted display device to another computing device of the another user to allow the another user to join the session of the application.

12. The method of claim 8, wherein:

the formatted version of the first data stream of augmented reality images and the second data stream of augmented reality images overlap the real-world object.

13. The method of claim 8, wherein:

the first augmented reality image and the second augmented reality image are not registered to the real-world object before the selection.

14. The method of claim 8, wherein:

the formatted version of the first augmented reality image and the second augmented reality image are displayed concurrently in respective regions within a shape of the real-world object.

15. The method of claim 8, further comprising:

tracking a gaze direction of the eye of the user; and making a determination as to whether the gaze direction is in a direction of the real-world object, and if the determination indicates the gaze direction is in the direction of the real-world object, projecting the augmented reality image which highlights the real-world object.

16. The method of claim 8, further comprising:

determining an orientation of the user's head; and projecting the augmented reality image which highlights the real-world object based on a determination that the orientation of the user's head indicates that the user is looking in a direction of the real-world object.

17. A computer readable memory having computer readable software embodied thereon for programming a processor to perform a method for controlling a head-mounted display device, the method comprising:

determining a location of user of the head-mounted display device;

processing image data from a forward-facing camera of the head-mounted display device to make an identification of a real-world object at the location;

in response to the identification, concurrently projecting to an eye of the user at a first time: (a) an augmented reality image which highlights and overlaps the real-world object and which is registered to the real-world object, (b) a first data stream of augmented reality images which do not overlap the real-world object, and (c) a second data stream of augmented reality images which do not overlap the real-world object;

receiving a selection of the first data stream and the second data stream from the user; and in response to the selection, concurrently projecting to the eye of the user, at a second time after the first time, in place of the augmented reality image which highlights the real-world object, and registered to the real-world object: (d) a formatted version of the first data stream of augmented reality images, formatted to a size of the real-world object and comprising fewer lines of text than the first augmented reality image which is displayed at the first time, and (e) the second data stream of augmented reality images formatted to the size of the real-world object.

18. The computer readable memory of claim 17, wherein:

the formatted version of the first data stream of augmented reality images and the second data stream of augmented reality images overlap the real-world object.

19. The computer readable memory of claim 17, wherein:

the first augmented reality image and the second augmented reality image are not registered to the real-world object before the selection.

20. The computer readable memory of claim 17, wherein:

the formatted version of the first augmented reality image and the second augmented reality image are displayed concurrently in respective regions within a shape of the real-world object.

* * * * *